US009603076B2

(12) United States Patent
Tamura et al.

(10) Patent No.: US 9,603,076 B2
(45) Date of Patent: *Mar. 21, 2017

(54) METHOD AND APPARATUS FOR MEASUREMENT REPORTING IN CARRIER AGGREGATION WIRELESS COMMUNICATION SYSTEMS

(71) Applicant: Sun Patent Trust, New York, NY (US)

(72) Inventors: Takashi Tamura, Kanagawa (JP); Takahisa Aoyama, Kanagawa (JP); Jun Hirano, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,096

(22) Filed: Apr. 25, 2016

(65) Prior Publication Data

US 2016/0249270 A1     Aug. 25, 2016

Related U.S. Application Data

(63) Continuation of application No. 14/151,674, filed on Jan. 9, 2014, now Pat. No. 9,351,220, which is a (Continued)

(30) Foreign Application Priority Data

Mar. 16, 2009  (JP) ................................. 2009-063552
Jan. 7, 2010   (JP) ................................. 2010-002238

(51) Int. Cl.
*H04W 36/30*    (2009.01)
*H04W 24/10*    (2009.01)
(Continued)

(52) U.S. Cl.
CPC .......... *H04W 36/30* (2013.01); *H04B 17/318* (2015.01); *H04W 24/10* (2013.01);
(Continued)

(58) Field of Classification Search
CPC . H04W 24/10; H04W 36/0088; H04W 36/30; H04W 24/00; H04W 36/0016;
(Continued)

(56) References Cited

U.S. PATENT DOCUMENTS 6,445,917 B1   9/2002  Bark et al.
8,305,997 B2   11/2012 Virkki et al.
(Continued)

OTHER PUBLICATIONS

3GPP, "3rd Generation Partnership Project; Technical Specification Group Radio Access Network; Radio Resource Control (RRC); Protocol Specification (Release 8)," 3GPP ST 25.331 V8.5.0 (Dec. 2008), 1646 pages, 2008.
(Continued)

*Primary Examiner* — Liton Miah
(74) *Attorney, Agent, or Firm* — Seed IP Law Group LLP

(57) ABSTRACT

When detecting occurrence of an event for transmitting a measurement report of a radio condition of a cell at a frequency set for a base station apparatus, to the base station apparatus (3) communicating with a terminal apparatus (2), the terminal apparatus (2) in a wireless communication system (1) creates a measurement report including information indicating radio conditions of cells at a frequency at which the event occurred and at another different frequency. The base station apparatus (3) controls whether or not to perform handover of the terminal apparatus (2) to another cell, on the basis of the measurement report transmitted from the terminal apparatus (2). Thereby, there is provided a wireless communication system in which a base station apparatus and the terminal apparatus are communicable with each other using multiple frequencies, the wireless communication system being capable of shortening time required for handover.

14 Claims, 28 Drawing Sheets

Related U.S. Application Data continuation of application No. 13/256,613, filed as application No. PCT/JP2010/001032 on Feb. 18, 2010, now Pat. No. 8,660,559.

(51) Int. Cl.
  *H04W 36/00* (2009.01)
  *H04B 17/318* (2015.01)
  *H04W 24/00* (2009.01)
  *H04W 36/08* (2009.01)

(52) U.S. Cl.
  CPC ........ *H04W 36/0094* (2013.01); *H04W 24/00* (2013.01); *H04W 36/08* (2013.01)

(58) Field of Classification Search
  CPC ......... H04W 36/0083; H04W 36/0094; H04W 36/14; H04W 36/26; H04W 52/0216
  See application file for complete search history.

(56) References Cited

U.S. PATENT DOCUMENTS

| | | |
|---|---|---|
| 8,315,641 B2 | 11/2012 | Chun et al. |
| 8,548,471 B2 | 10/2013 | Iwamura et al. |
| 2007/0230400 A1 | 10/2007 | Kuchibhotla et al. |
| 2009/0232098 A1 | 9/2009 | Makabe |
| 2010/0182919 A1 | 7/2010 | Lee et al. |
| 2011/0076999 A1 | 3/2011 | Kazmi et al. |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.7.0 (Dec. 2008), 144 pages, 2008.

3GPP, "3rd Generation Partnership Project; Technical Specification Group Radio Access Network; Evolved Universal Terrestrial Radio Access (E-UTRA) Radio Resource Control (RRC); Protocol specification (Release 8)," 3GPP TS 36.331 V8.4.0 (Dec. 2008), 198 pages, 2008.

3GPP, "Discussion on measurement reporting," R2-083329, 3GPP TSG-RAN WG2 #62bis, Warsaw, Poland, Jun. 30-Jul. 4, 2008, 3 pages.

3GPP, "Measurement configuration structure for carrier aggregation," R2-094966, 3GPP TSG-RAN2 Meeting #67, Shenzhen, China, Aug. 24-28, 2009, 4 pages.

CATT, "Measurement in CA," R2-096504, Agenda Item: 7.3.5, 3GPP TSG RAN WG2 Meeting #68, Jeju, Korea, Nov. 9-13, 2009, 4 pages.

International Search Report for PCT/JP2010/001032, mailed May 25, 2010, 2 pages.

International Preliminary Report on Patentability, mailed Oct. 18, 2011, for PCT/JP2010/001032, 6 pages.

Office Action, dated Aug. 6, 2013, for corresponding Russian Application No. 2011141791/07 (62544), 16 pages, with English translation.

Potevio, "Measurement report triggering in Carrier Aggregation," R2-096545, Agenda Item: 7.3.5, 3GPP TSG-RAN WG2 Meeting #68, Jeju, Korea, Nov. 9-13, 2009, 5 pages.

Fig. 1
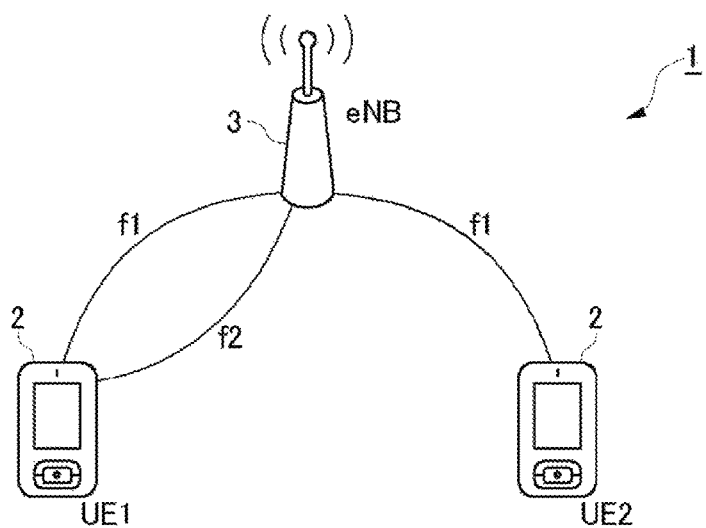
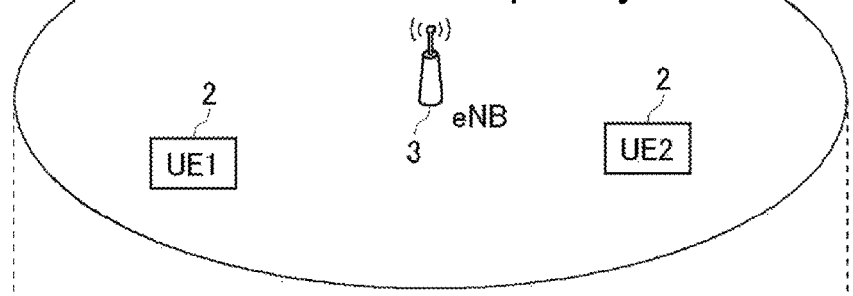
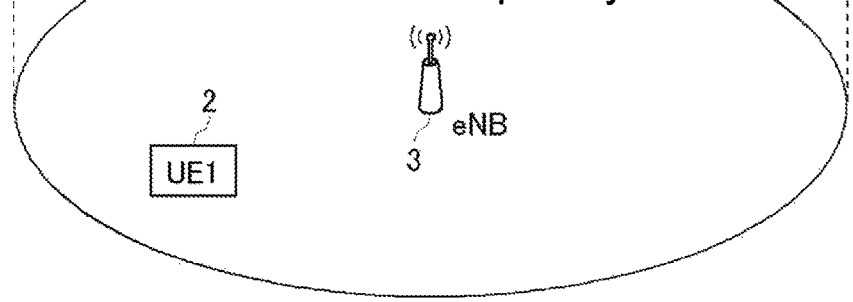

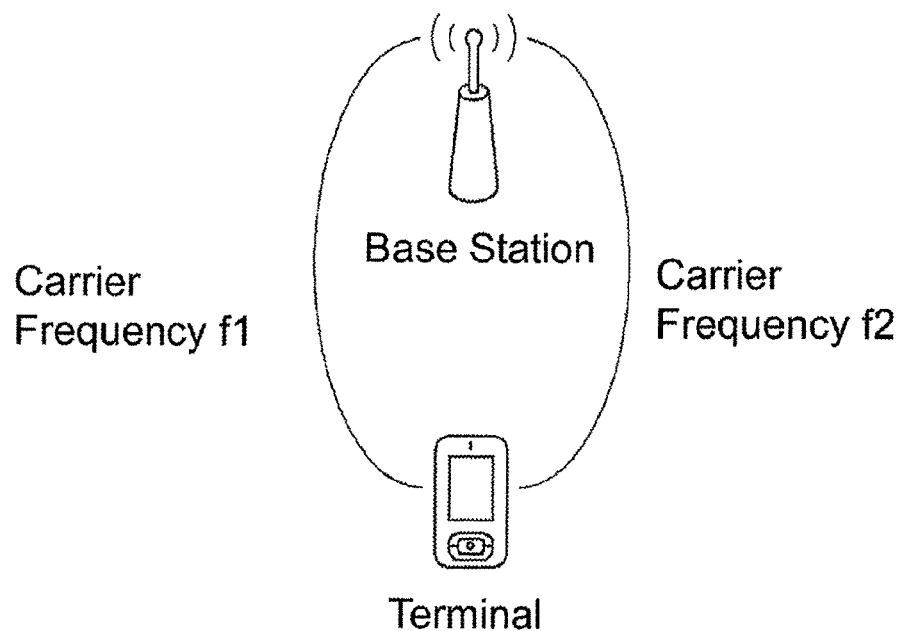
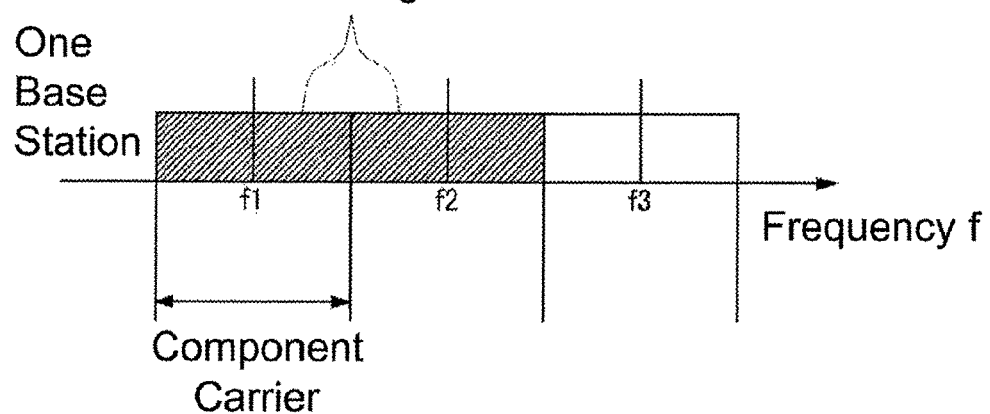
*Fig. 20*

*Fig. 24*

```
-- ASN1START

MeasurementReport ::=           SEQUENCE {
    criticalExtensions              CHOICE {
        c1                          CHOICE{
            measurementReport-r8            MeasurementReport-r8-IEs,
            measurementReport-r10           MeasurementReport-r10-IEs,
            spare6 NULL, spare5 NULL, spare4 NULL,
            spare3 NULL, spare2 NULL, spare1 NULL
        },
        criticalExtensionsFuture        SEQUENCE {}
    }
}

MeasurementReport-r8-IEs ::=    SEQUENCE {
    measResults                 MeasResults,
    nonCriticalExtension        SEQUENCE {}                        OPTIONAL
}

MeasurementReport-r10-IEs ::=   SEQUENCE {
    measResults-r10             MeasResults-r10,
    nonCriticalExtension        SEQUENCE {}                        OPTIONAL
}

-- ASN1STOP
```

Fig. 25

```
-- ASN1START

MeasResults-r10 ::=                SEQUENCE {
    measResultsSet-r10             MeasResultsSet-r10
}

MeasResultsSet-r10::=    SEQUENCE (SIZE (1..number)) OF MeasResults

MesResults ::=                     SEQUENCE {
    measId                         MeasId,
    measResultServCell             SEQUENCE {
        rsrpResult                 RSRP-Range,
        rsrqResult                 RSRQ-Range
    },
    measResultNeighCells           CHOICE {
        measResultListEUTRA            MeasResultListEUTRA,
        measResultListUTRA             MeasResultListUTRA,
        measResultListGERAN            MeasResultListGERAN,
        measResultsCDMA2000            MeasResultsCDMA2000,
        ...
    }                                                   OPTIONAL,
    ...
}

MeasResultListEUTRA ::=      SEQUENCE (SIZE (1..maxCellReport)) OF
MeasResultEUTRA MeasResultEUTRA ::=   SEQUENCE {
    physCellId                 PhysCellId,
    cgi-Info                   SEQUENCE {
        cellGlobalId               CellGlobalIdEUTRA,
        trackingAreaCode           TrackingAreaCode,
        plmn-IdentityList          PLMN-IdentityList2              OPTIONAL
    }                                   OPTIONAL,
    measResult                 SEQUENCE {
        rsrpResult                 RSRP-Range              OPTIONAL,
        rsrqResult                 RSRQ-Range              OPTIONAL,
        ...
    }
}
-- ASN1STOP
```

Fig. 26

```
-- ASN1START

MeasResults ::=                 SEQUENCE {
    measId                          MeasId,
    measResultServCell              SEQUENCE {
        rsrpResult                      RSRP-Range,
        rsrqResult                      RSRQ-Range
    },
    measResultNeighCells            CHOICE {
        measResultListEUTRA             MeasResultListEUTRA,
        measResultListUTRA              MeasResultListUTRA,
        measResultListGERAN             MeasResultListGERAN,
        measResultsCDMA2000             MeasResultsCDMA2000,
        ...
    }                                                       OPTIONAL,
    ...
    measResults-v10x0               MeasResultsSet-r10
}

MeasResultsSet-r10::=           SEQUENCE (SIZE (1..number)) OF MeasResults-r10

MeasResults-r10{
    measId                          MeasId,
    measResultServCell              SEQUENCE {
        rsrpResult                      RSRP-Range,
        rsrqResult                      RSRQ-Range
    }                                                       OPTIONAL, measResultNeighCells            CHOICE {
        measResultListEUTRA             MeasResultListEUTRA,
        measResultListUTRA              MeasResultListUTRA,
        measResultListGERAN             MeasResultListGERAN,
        measResultsCDMA2000             MeasResultsCDMA2000,
        ...
    }                                                       OPTIONAL,
}

MeasResultListEUTRA ::=         SEQUENCE (SIZE (1..maxCellReport)) OF
MeasResultEUTRA MeasResultEUTRA ::= SEQUENCE {
    physCellId                      PhysCellId,
    cgi-Info                        SEQUENCE {
        cellGlobalId                    CellGlobalIdEUTRA,
        trackingAreaCode                TrackingAreaCode,
        plmn-IdentityList               PLMN-IdentityList2          OPTIONAL
    }                                                       OPTIONAL,
    measResult                      SEQUENCE {
        rsrpResult                      RSRP-Range                  OPTIONAL,
        rsrqResult                      RSRQ-Range                  OPTIONAL,
        ...
    }
}

-- ASN1STOP
```

*Fig. 27*

```
-- ASN1START

MeasResults-r10 ::=                 SEQUENCE {
    measId                      MeasId,
    measResultsSet-r10              MeasResultsSet-r10
}

MeasResultsSet-r10::=       SEQUENCE (SIZE (1..number)) OF MeasResultsBody-r10

MeasResultsBody-r10 ::=             SEQUENCE {
    measObjectID                MeasObjectId,
    measResultServCell          SEQUENCE {
        rsrpResult                  RSRP-Range,
        rsrqResult                  RSRQ-Range
    },
    measResultNeighCells        CHOICE {
        measResultListEUTRA             MeasResultListEUTRA,
        measResultListUTRA          MeasResultListUTRA,
        measResultListGERAN             MeasResultListGERAN,
        measResultsCDMA2000             MeasResultsCDMA2000,
        ...
    }                                                       OPTIONAL,
    ...
}

MeasResultListEUTRA ::=     SEQUENCE (SIZE (1..maxCellReport)) OF
MeasResultEUTRA MeasResultEUTRA ::=    SEQUENCE {
    physCellId                  PhysCellId,
    cgi-Info                    SEQUENCE {
        cellGlobalId                CellGlobalIdEUTRA,
        trackingAreaCode                TrackingAreaCode,
        plmn-IdentityList               PLMN-IdentityList2          OPTIONAL
    }                                                       OPTIONAL,
    measResult                  SEQUENCE {
        rsrpResult                  RSRP-Range              OPTIONAL,
        rsrqResult                  RSRQ-Range              OPTIONAL,
        ...
    }
}

-- ASN1STOP
```

*Fig. 28*

```
-- ASN1START
MeasResults ::=                  SEQUENCE {
   measId                        MeasId,
   measResultServCell            SEQUENCE {
      rsrpResult                 RSRP-Range,
      rsrqResult                 RSRQ-Range
   },
   measResultNeighCells          CHOICE {
      measResultListEUTRA             MeasResultListEUTRA,
      measResultListUTRA              MeasResultListUTRA,
      measResultListGERAN             MeasResultListGERAN,
      measResultsCDMA2000             MeasResultsCDMA2000,
      ...
   }                                                  OPTIONAL,
   ...
   measResults-v10x0             MeasResultsSet-r10
}

MeasResultsSet-r10::=     SEQUENCE (SIZE (1..number)) OF MeasResults-r10

MeasResults-r10{
   measObjectId                  MeasObjectId,
   measResultServCell            SEQUENCE {
      rsrpResult                 RSRP-Range,
      rsrqResult                 RSRQ-Range
   }                                                  OPTIONAL, measResultNeighCells          CHOICE {
      measResultListEUTRA             MeasResultListEUTRA,
      measResultListUTRA              MeasResultListUTRA,
      measResultListGERAN             MeasResultListGERAN,
      measResultsCDMA2000             MeasResultsCDMA2000,
      ...
   }                                                  OPTIONAL,
}

MeasResultListEUTRA ::=   SEQUENCE (SIZE (1..maxCellReport)) OF
MeasResultEUTRA

MeasResultEUTRA ::=   SEQUENCE {
   physCellId                    PhysCellId,
   cgi-Info                      SEQUENCE {
      cellGlobalId               CellGlobalIdEUTRA,
      trackingAreaCode           TrackingAreaCode,
      plmn-IdentityList          PLMN-IdentityList2           OPTIONAL
   }                                                  OPTIONAL,
   measResult                    SEQUENCE {
      rsrpResult                 RSRP-Range            OPTIONAL,
      rsrqResult                 RSRQ-Range            OPTIONAL,
      ...
   }
}

-- ASN1STOP
```

METHOD AND APPARATUS FOR MEASUREMENT REPORTING IN CARRIER AGGREGATION WIRELESS COMMUNICATION SYSTEMS

BACKGROUND

Technical Field

The present invention relates to a wireless communication system in which a base station apparatus and a terminal apparatus can communicate with each other using multiple frequencies.

Description of the Related Art

The standardization body 3GPP (The $3^{rd}$ Generation Partnership Project) promotes standardization of LTE (Long Term Evolution) as the next generation communication standard of W-CDMA (Wideband Code Division Multiple Access) system (for example, see Non Patent Literatures 1 to 3).

In this LTE, a base station (E-UTRAN NodeB; also referred to as eNB) of a network (E-UTRAN: Evolved Universal Mobile Radio Access Network) has multiple communication cells (also referred to as cells), and a terminal (user equipment; hereinafter also referred to as a UE) belongs to one of the cells. There are two states of the terminal: a state called an idle state (RRC Idle) in which a radio bearer is not established between the terminal and the base station and a state called a connected state (RRC Connected) in which a radio bearer is established between the terminal and the base station. When transmitting/receiving data, the terminal is required to transit from the idle state to the connected state.

FIG. 15 is a sequence diagram for illustrating transition from the idle state of a terminal to the connected state. The terminal uses random access means (random access channel procedure; hereinafter also referred to as an RACH procedure) to synchronize with the base station. As shown in FIG. 15, the terminal sends an RACH to the base station, and the base station sends an RACH response message (RACH response) to the terminal as a response to the RACH. Through the above operation, the terminal can synchronize with the base station and can use a signaling radio bearer 0 (hereinafter also referred to as an SRB0) for transmitting/receiving a radio resource control message (hereinafter also referred to as an RRC message) using a common control channel (hereinafter also referred to as a CCCH).

The terminal sends an RRC connection request to the base station to establish an RRC connection, using the SRB0. The base station transmits an RRC connection setup to the terminal using the SRB0 in order to establish a signaling radio bearer 1 (hereinafter referred to as an SRB1) for transmitting/receiving an RRC message and a non-access stratum message (hereinafter also referred to as an NAS message) using a dedicated control channel (hereinafter also referred to as a DCCH). When receiving the RRC connection setup, the terminal establishes the SRB1.

Next, the terminal sends an RRC connection setup complete to the base station using the SRB1 to confirm that establishment of an RRC connection has succeeded and has been completed. The base station sends a security mode command using the SRB1 to enable AS security (access stratum security) using the SRB1. After that, when a security mode complete sent from the terminal is received, AS security is enabled between the terminal and the base station.

At this time, the base station establishes a signaling radio bearer 2 (hereinafter also referred to as an SRB2) for transmitting/receiving an NAS message with a lower priority than the SRB1 in order to prioritize transmission of an RRC message with a higher urgency (for example, a handover command and a measurement report) over an NAS message with a lower urgency (for example, addition of a service). When the base station transmits an RRC connection reconfiguration to the terminal, and the terminal receives the RRC connection reconfiguration, the SRB2 is established. The terminal transmits an RRC connection reconfiguration complete to the base station using the SRB1 in order to confirm that RRC connection reconfiguration has succeeded and has been completed.

This RRC connection reconfiguration includes configuration information about a data radio bearer (hereinafter also referred to as a DRB) for transmitting/receiving data between the terminal and the base station, and the terminal establishes the DRB based on the RRC connection reconfiguration. In this way, the terminal can transit to the connected state.

When the terminal in the connected state moves out of a cell, a technique called handover (hereinafter also referred to as HO) is used in which the terminal switches communication with its own cell to communication with another cell to avoid disconnection of the communication. FIG. 16 is a sequence diagram showing an example of handover. As shown in FIG. 16, the terminal measures received power or received quality on the basis of configuration of measurement of a received signal included in the RRC connection reconfiguration described above. When an event (for example, the received power exceeding a set threshold) causing a measurement report to be sent occurs, the terminal sends a measurement result to a connected base station (hereinafter also referred to as a source eNB) as a measurement report. The source eNB decides a base station to be a handover destination of the terminal (hereinafter also referred to as a target eNB) on the basis of the measurement report, and sends a handover request to the target eNB in order to communicate a request for handover and information required for handover, to the target eNB.

When receiving the handover request, the target eNB sets a handover command which includes measurement configuration, mobility control information, radio resource configuration, security configuration and the like, and sends the handover command to the source eNB as a handover request ACK. When receiving the handover command from the target eNB, the source eNB sends the handover command to the UE without change. At this time, the source eNB sends a DL allocation to the UE. The source eNB transfers the sequence number (hereinafter also referred to as the SN) of a data packet to be sent to the UE earliest, among the SNs of data packets which have not been sent to the UE yet, to the target eNB and transfers data to be sent to the UE also, to the target eNB.

The UE synchronizes with the target eNB using the RACH procedure, sends a handover confirmation to the target eNB, and completes handover. In this way, the UE in the connected state can switch communication from a base station which the UE is communicating with, to another base station without disconnection of the communication.

The measurement configuration for causing the terminal to measure received power or received quality includes information such as measurement identities (MeasID) which are identities indicating measurement, a measurement object (MeasObject) indicating a measurement target, quantity configuration (QuantityConfig) indicating a measurement result filtering processing operation and the like, reporting configuration (ReportConfig) indicating the configuration of a measurement report, quantity configuration indicating the configuration of values of the measurement result, and a measurement gap indicating a period during which data for measuring other frequencies or other systems is neither transmitted nor received. This measurement configuration is included in RRC connection reconfiguration and sent to the UE from the eNB. Among the above, MeasID, MeasObject and ReportConfig perform operations in cooperation with one another. FIG. 17 is a diagram showing an example of the measurement configuration.

As shown in FIG. 17, MeasID is an identity indicating measurement and identifies a measurement configured by combination of MeasObjectID which is an identity indicating MeasObject and ReportConfigID which is an identity indicating ReportConfig. FIG. 18 is a diagram showing an example of MeasObject. As shown in FIG. 18, MeasObject is constituted by a carrier frequency, the bandwidth of measurement, a frequency offset, a list of neighbor cells, a blacklist, a report CGI (cell global identity) and the like. ReportConfig is constituted by the kind of the trigger for a measurement report, a trigger quantity, a report quantity, the maximum number of cells to be reported, a report cycle, the amount of report (reportAmount) and the like.

The ways of sending a measurement report includes: sending a measurement report at the time of occurrence of an event (event trigger reporting), sending it periodically (periodic reporting), and sending it periodically after occurrence of an event (event trigger periodic reporting). There are five kinds of E-UTRAN events, for example, an event of a serving cell being above a threshold, an event of a serving cell being below a threshold, an event of a neighbor cell being better than a servicing cell, an event of a neighbor cell being better than a threshold, and an event of a servicing cell being worse than a threshold 1 and a neighbor cell being better than a threshold 2, and the like.

FIG. 19 is a diagram showing an example of the measurement report. In the example of the measurement report shown in FIG. 19, information of MeasID, reference signal received power (hereinafter also referred to as RSRP) of a serving cell, and reference signal received quality (hereinafter also referred to as RSRQ) of the serving cell is included in the top part, and the next part includes neighbor cell information. The neighbor cell information includes information of a physical cell identity (hereinafter also referred to as a PCI). Furthermore, information of a global cell identity (hereinafter also referred to as a CGI), a tracking area code and a PLMN identity list (public land mobile network identity list; hereinafter also referred to as a PLMN list) is optionally included. This neighbor cell information optionally includes RSRP and RSRQ information. If there are multiple neighbor cells, multiple pieces of neighbor cell information are included. For example, after the first neighbor cell information, the next neighbor cell information is included as shown in FIG. 19. The terminal performs measurement indicated by MeasID and sends a measurement report to the base station. The base station decides whether or not to perform handover on the basis of the measurement report (and, if handover is to be performed, to which cell the handover is to be performed), and, if handover is to be performed, starts a procedure therefore.

Recently, the standardization body 3GPP has promoted standardization of LTE-A (LTE-Advanced) as a next generation radio communication standard compatible with LTE. For LTE-A, introduction of band aggregation (also referred to as carrier aggregation) in which a terminal uses multiple carrier frequencies of one base station is examined. FIG. 20 is a diagram showing the outline of band aggregation. In FIG. 20, an example is shown in which a terminal uses, for example, two component carriers the carrier frequencies of which are f1 and f2, among three component carriers (the carrier frequencies of which are f1, f2 and f3). By using multiple component carriers as described above, improvement of throughput of communication between a terminal and a base station is expected.

However, in the existing method described above, occurrence of an event causing transmission of a measurement report is determined by comparison with a terminal's own cell. Therefore, if multiple frequencies (for example, the two frequencies f1 and f2) are used in band aggregation, the case is just like the case where there are two terminal's own cells. Then, if an event causing transmission of a measurement report occurs in one of the terminal's own cells, the terminal sends a measurement report to a base station, and the base station decides handover on the basis of the measurement report, then appropriate handover is not performed because the other of the terminal's own cell is not considered at all.

Accordingly, it is conceivable to adopt a method in which the base station requests the terminal to transmit a measurement report on the basis of the other of the terminal's own cells. In this case, operations of transmitting RRC connection reconfiguration from the base station and receiving the measurement report of the other of the terminal's own cells from the terminal are required before the base station receives the measurement report of the other of the terminal's own cells, and therefore, it takes prolonged time to perform handover (contrary to the demand for shortening time required for handover as much as possible).

CITATION LIST

Non Patent Literature

Non Patent Literature 1: 3GPP TS36.331 v8.4.0 "Evolved Universal Terrestrial Radio Access (E-UTRA) Radio Resource Control (RRC)"
Non Patent Literature 2: 3GPP TS36.300 v8.7.0 "Evolved Universal Terrestrial Radio Access (E-UTRA) and Evolved Universal Terrestrial Radio Access Network (E-UTRAN); Overall description; Stage 2"
Non Patent Literature 3: 3GPP TS25.331 v8.5.0 "Radio Resource Control (RRC); Protocol specification"

BRIEF SUMMARY

Technical Problem

The present invention has been made under the background described above. The object of the present invention is to provide a wireless communication system in which a base station apparatus and a terminal apparatus can communicate with each other using multiple frequencies, the wireless communication system being capable of shortening time required for handover of the terminal apparatus.

Solution to Problem

One aspect of the present invention is a terminal apparatus used in a wireless communication system in which a base station apparatus and the terminal apparatus are communicable with each other using multiple frequencies; and this terminal apparatus is provided with: an event detecting section that detects occurrence of an event for transmitting a measurement report of a radio condition of a cell at a frequency set for the base station apparatus, to the base station communicating with the terminal apparatus; and a measurement report creating section that creates the measurement report including information indicating radio conditions of the cells at a frequency at which the event occurred and at other different frequency, on the basis of occurrence of the event; and the base station apparatus controls whether or not to perform handover to the cell of the terminal apparatus on the basis of the measurement report transmitted from the terminal apparatus.

Another aspect of the present invention is a wireless communication system in which a base station apparatus and the terminal apparatus are communicable with each other using multiple frequencies; and the terminal apparatus is provided with: an event detecting section that detects occurrence of an event for transmitting a measurement report of a radio condition of a cell at a frequency set for the base station apparatus, to the base station communicating with the terminal apparatus; and a measurement report creating section that creates the measurement report including information indicating radio conditions of the cells at a frequency at which the event occurred and at another different frequency, on the basis of occurrence of the event; and the base station apparatus is provided with: a handover control section that controls whether or not to perform handover to the cell of the terminal apparatus on the basis of the measurement report transmitted from the terminal apparatus.

Another aspect of the present invention is a base station apparatus used in a wireless communication system in which the base station apparatus and a terminal apparatus are communicable with each other using multiple frequencies; the terminal apparatus creating the measurement report including information indicating radio conditions of cells at a frequency at which the event occurred and at another different frequency, on the basis of occurrence of an event for transmitting a measurement report of a radio condition of a cell at a frequency set for the base station apparatus, to the base station communicating with the terminal apparatus; and the base station apparatus being provided with a handover control section that controls whether or not to perform handover to the cell of the terminal apparatus on the basis of the measurement report transmitted from the terminal apparatus.

Another aspect of the present invention is a wireless communication method used in a wireless communication system in which a base station apparatus and the terminal apparatus are communicable with each other using multiple frequencies; and this method includes: the terminal apparatus detecting occurrence of an event for transmitting a measurement report of a radio condition of a cell at a frequency set for the base station apparatus, to the base station communicating with the terminal apparatus; and the terminal apparatus creating the measurement report including information indicating radio conditions of the cells at a frequency at which the event occurred and at another different frequency, on the basis of occurrence of the event; and the base station apparatus controlling whether or not to perform handover to the cell of the terminal apparatus on the basis of the measurement report transmitted from the terminal apparatus.

As described below, other aspects exist in the present invention. Therefore, this disclosure of the invention intends to provide a part of aspects of the present invention and does not intend to limit the scope of the invention described and claimed here.

BRIEF DESCRIPTION OF THE SEVERAL VIEWS OF THE DRAWINGS

FIG. 1 is a diagram showing an example of the positional relationship between a base station apparatus and a terminal apparatus in a wireless communication system.

FIG. 20 is a diagram showing the outline of band aggregation.

FIG. 24 is a diagram showing an example of a measurement report format in a twelfth embodiment.

FIG. 25 is a diagram showing another example of the measurement report format.

FIG. 26 is a diagram showing another example of the measurement report format.

FIG. 27 is a diagram showing another example of the measurement report format.

FIG. 28 is a diagram showing another example of the measurement report format.

DETAILED DESCRIPTION

Figure 2:
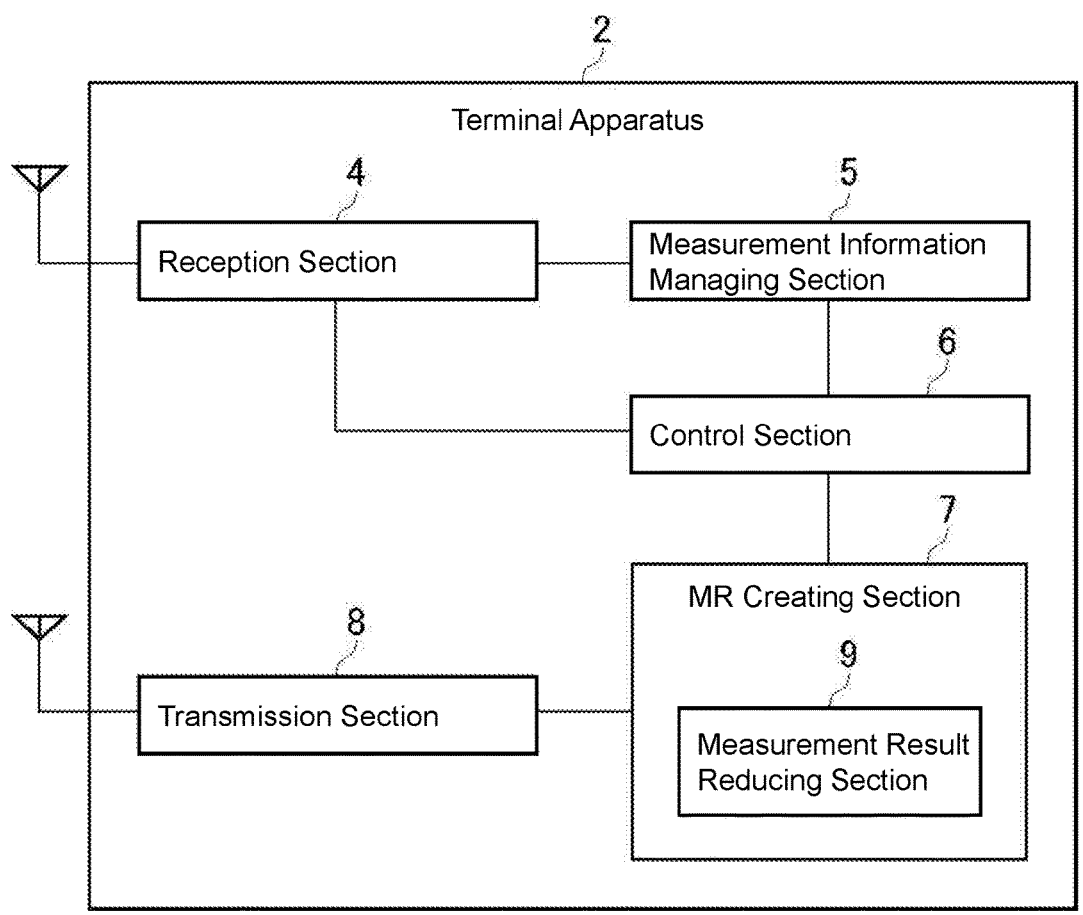
FIG. 2 is a block diagram for illustrating the configuration of a terminal apparatus of a first embodiment.

Detailed description of the present invention will be shown below. However, the detailed description below and accompanying drawings are not intended to limit the invention. Instead, the scope of the invention is specified by the accompanying claims.

The wireless communication system of the present invention is a wireless communication system in which a base station apparatus and a terminal apparatus can communicate with each other using multiple frequencies, which is configured so that the terminal apparatus is provided with: an event detecting section that detects occurrence of an event for transmitting a measurement report of a radio condition of a cell at a frequency set for the base station apparatus, to the base station communicating with the terminal apparatus; and a measurement report creating section that creates the measurement report including information indicating radio conditions of the cells at a frequency at which the event occurred and at another different frequency, on the basis of occurrence of the event; and the base station apparatus is provided with a handover control section that controls whether or not to perform handover to the cell of the terminal apparatus on the basis of the measurement report transmitted from the terminal apparatus.

Due to this configuration, when an event occurs at a frequency set for the terminal apparatus by the base station apparatus, a measurement report including information indicating radio conditions of cells at a frequency at which the event occurred and at another different frequency is transmitted from the terminal apparatus to the base station, and it is controlled whether or not to perform handover of the terminal apparatus on the basis of the measurement report. Thus, even in the wireless communication system in which the base station apparatus and the terminal apparatus are communicable with each other using multiple frequencies, the base station can quickly decide whether or not to perform handover of the terminal apparatus on the basis of only the measurement report. Thereby, in the wireless communication system in which the base station apparatus and the terminal apparatus are communicable with each other using multiple frequencies, time required for handover is shortened.

The terminal apparatus of the present invention is a terminal apparatus used in a wireless communication system in which a base station apparatus and the terminal apparatus are communicable with each other using multiple frequencies, the terminal apparatus being provided with: an event detecting section that detects occurrence of an event for transmitting a measurement report of a radio condition of a cell at a frequency set for the base station apparatus, to the base station communicating with the terminal apparatus; and a measurement report creating section that creates the measurement report including information indicating radio conditions of the cells at a frequency at which the event occurred and at another different frequency, on the basis of occurrence of the event; and the base station apparatus is configured to control whether or not to perform handover to the cell of the terminal apparatus on the basis of the measurement report transmitted from the terminal apparatus.

Due to this configuration also, it is possible, even in the wireless communication system in which the base station apparatus and the terminal apparatus are communicable with each other using multiple frequencies, for the base station apparatus to quickly decide whether or not to perform handover of the terminal apparatus on the basis of only the measurement report, similarly to the above description. Thereby, in the wireless communication system in which the base station apparatus and the terminal apparatus are communicable with each other using multiple frequencies, time required for handover is shortened.

The base station apparatus of the present invention is a base station apparatus used in a wireless communication system in which the base station apparatus and a terminal apparatus are communicable with each other using multiple frequencies; the terminal apparatus creating the measurement report including information indicating radio conditions of cells at a frequency at which the event occurred and at another different frequency, on the basis of occurrence of an event for transmitting a measurement report of a radio condition of a cell at a frequency set for the base station apparatus, to the base station communicating with the terminal apparatus; and the base station apparatus is configured to have a handover control section that controls whether or not to perform handover to the cell of the terminal apparatus on the basis of the measurement report transmitted from the terminal apparatus.

Due to this configuration also, even in the wireless communication system in which the base station and the terminal apparatus are communicable with each other using multiple frequencies, the base station can quickly decide whether or not to perform handover of the terminal apparatus on the basis of only the measurement report, similarly to the above description. Thereby, time required for handover is shortened in the wireless communication system in which the base station apparatus and the terminal apparatus are communicable with each other using multiple frequencies.

The wireless communication method of the present invention is a wireless communication method used in a wireless communication system in which a base station apparatus and the terminal apparatus are communicable with each other using multiple frequencies, and the method includes: the terminal apparatus detecting occurrence of an event for transmitting a measurement report of a radio condition of a cell at a frequency set for the base station apparatus, to the base station communicating with the terminal apparatus; and the terminal apparatus creating the measurement report including information indicating radio conditions of the cells at a frequency at which the event occurred and at another different frequency, on the basis of occurrence of the event; and the base station apparatus controlling whether or not to perform handover to the cell of the terminal apparatus on the basis of the measurement report transmitted from the terminal apparatus.

According to this method also, it is possible, even in the wireless communication system in which the base station apparatus and the terminal apparatus are communicable with each other using multiple frequencies, for the base station apparatus to quickly decide whether or not to perform handover of the terminal apparatus on the basis of only the measurement report, similarly to the above description. Thereby, in the wireless communication system in which the base station apparatus and the terminal apparatus are communicable with each other using multiple frequencies, time required for handover is shortened.

The present invention makes it possible to shorten time required for handover in a wireless communication system in which a base station apparatus and a terminal apparatus are communicable with each other using multiple frequencies, by providing a measurement report creating section that creates a measurement report including information indicating radio conditions of cells at a frequency being used for communication with the base station and at another different frequency, for the terminal apparatus.

The wireless communication system of embodiments of the present invention will be described below with the use of drawings. In the embodiments below, the case of a wireless communication system using Long Term Evolution (LTE), System Architecture Evolution (SAE) or the like, which are mobile communication techniques standardized by 3GPP, will be described as an example. However, the scope of the present invention is not limited thereto. That is, the present invention can be applied to wireless systems using wireless access techniques such as a wireless LAN (wireless local area network), WiMAX (Worldwide Interoperability for Microwave Access) such as IEEE802.16, IEEE802.16e and IEEE802.16m, 3GPP2, and a fourth generation mobile communication technique.

In the embodiments below, description will be made on a wireless communication system in which a base station apparatus (also referred to simply as a base station) and a terminal apparatus (also referred to simply as a terminal) can communicate with each other using multiple frequencies (for example, two frequencies f1 and f2) as an example. In this case, multiple communication cells are configured at the multiple frequencies by one base station apparatus.

FIG. 1 is a diagram showing an example of the positional relationship between a base station apparatus and a terminal apparatus in the wireless communication system of the embodiments of the present invention. As shown in FIG. 1, a wireless communication system 1 is constituted by terminal apparatuses 2 (UEs), such as a mobile telephone and a mobile terminal, and a base station apparatus 3 (eNB) which communicates with the terminal apparatuses 2. The base station 3 manages multiple cells at multiple frequencies (for example, three communication cells corresponding to the frequency f1 and communication cells corresponding to f2), and the terminal apparatuses 2 can use the component carriers of the multiple cells at the same time. To use the multiple component carriers at the same time is referred to as band aggregation. In the embodiments below, description will be made on the case of using two component carriers (the carrier frequencies f1 and f2) as an example of the band aggregation. However, the scope of the present invention is not limited thereto. For example, three or more component carriers may be used. The terminal apparatus 2 existing in a communication cell of the base station 3 may not only use the two component carriers by performing band aggregation but also use only one component carrier as the case may be (according to circumstances).

First Embodiment

Figure 3:
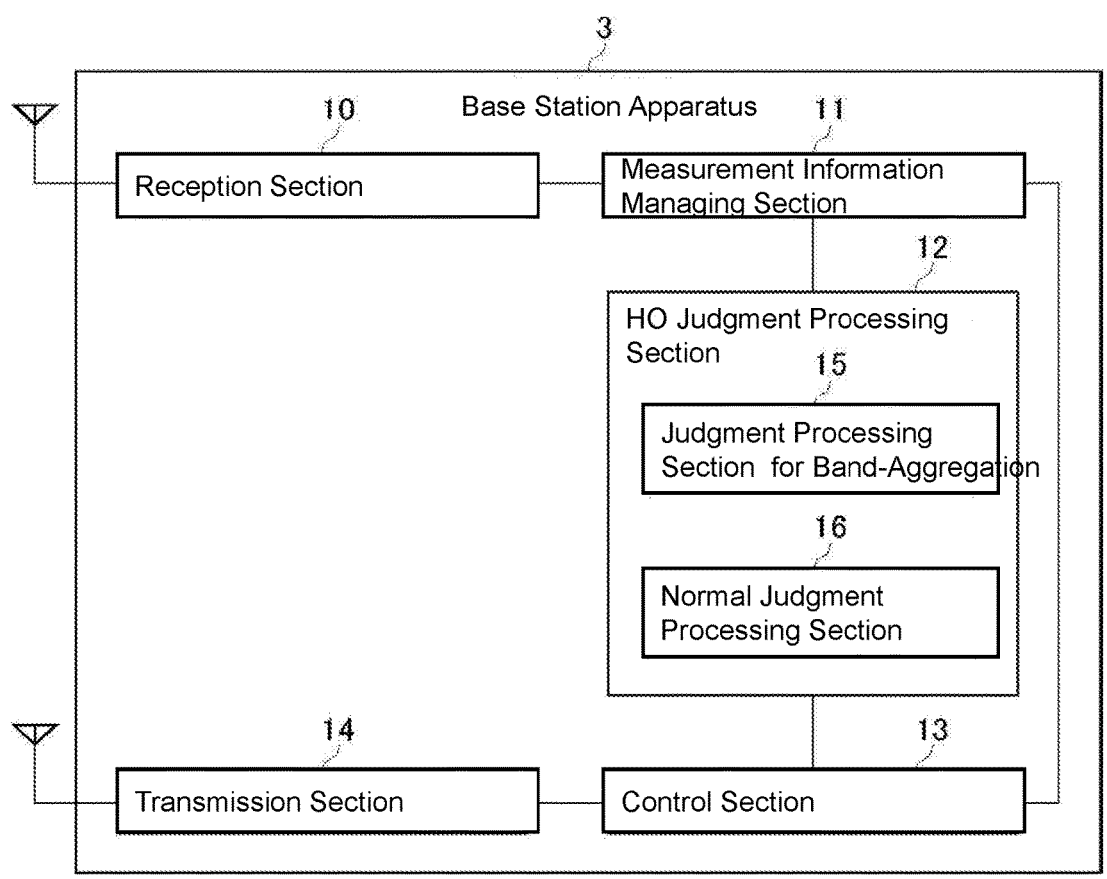
FIG. 3 is a block diagram for illustrating the configuration of a base station apparatus of the first embodiment.

The configuration of a wireless communication system 1 of a first embodiment will be described with reference to FIGS. 2 and 3. FIG. 2 is a block diagram for illustrating the configuration of the terminal apparatus 2 of this embodiment, and FIG. 3 is a block diagram for illustrating the configuration of the base station apparatus 3 of this embodiment.

In the wireless communication system 1 of this embodiment, the terminal apparatus 2 is provided with a function of receiving a reference signal transmitted from the base station 3 or another base station 3 via a downlink and reporting a measurement result of the received signal to the base station 3 via an uplink. The base station 3 is provided with a function of assigning and controlling wireless resources (for example, frequency bands in frequency domains and time domains) and performing handover processing in the case of judging that handover to another cell 3 is necessary from the reference signal measurement result reported from the terminal apparatus 2. The base station 3 can be said to play the role of an access point of a wireless access network for the terminal apparatus 2.

(Terminal Apparatus)

First, the configuration of the terminal apparatus 2 of this embodiment will be described with reference to FIG. 2. As shown in FIG. 2, the terminal apparatus 2 is provided with a reception section 4, a measurement information managing section 5, a control section 6, a measurement report creating section 7 and a transmission section 8.

The reception section 4 is provided with a function of receiving system information and the like transmitted from the base station 3 or another base station 3, in response to an indication sent from the control section 6. The reception section 4 is also provided with a function of receiving a reference signal transmitted from the base station 3 or another base station 3, in response to an indication sent from the measurement information managing section 5. The reception section 4 is configured to output the control information such as the system information to the control section 6 and output the reference signal to the measurement information managing section 5.

The measurement information managing section 5 is provided with a function of individually managing indications from the control section 6, such as measurement result output indications inputted from the control section 6 (for example, an indication to periodically output a measurement result, an indication to output a measurement result at the time of occurrence of an event, an indication to periodically output a measurement result after occurrence of an event, an indication to output a measurement result of a particular frequency and an indication to output a measurement result of a particular cell). The measurement information managing section outputs a reference signal reception indication to the reception section 4 in response to an indication from the control section 6. The measurement information managing section 5 is configured to, in the case where an indication from the control section 6 is applicable, output a measurement result corresponding to the indication to the control section 6. This measurement information managing section 5 is provided with a function of detecting occurrence of an event, and it corresponds to event detecting means of the present invention.

The control section 6 is provided with a function of performing measurement configuration on the basis of control information sent from the reception section 4 or control information incorporated in advance. This control section 6 is provided with a function of instructing the measurement information managing section 5 to output a measurement result, on the basis of the measurement configuration. The control section 6 is also provided with a function of judging whether to create a measurement report on the basis of only a measurement result of the carrier frequency of one component carrier or to create the measurement report by adding a measurement result of one carrier frequency to a measurement result of the carrier frequency of the other component carrier. That is, this control section 6 corresponds to judgment means of the present invention.

The measurement report creating section 7 is provided with a function of creating a measurement report from information inputted from the control section 6. This measurement report creating section 7 is provided with a measurement result reducing section 9 that selects a cell to be included into a measurement report from a measurement result inputted from the control section 6. The measurement report creating section 7 is configured to create a measurement report on the basis of a measurement result of a cell selected by this measurement result reducing section 9 and send the created measurement report to the transmission section 8. Here, this measurement report creating section 7 corresponds to measurement report creating means of the present invention. The transmission section 8 is provided with a function of transmitting inputted information to the base station 3.

(Base Station Apparatus)

Next, the configuration of the base station 3 of this embodiment will be described with reference to FIG. 3. As shown in FIG. 3, the base station 3 is provided with a reception section 10, a measurement information managing section 11, a handover judgment processing section 12, a control section 13 and a transmission section 14. The handover judgment processing section 12 is provided with a judgment processing section for band-aggregation 15 and a normal judgment processing section 16.

The reception section 10 is provided with a function of outputting a measurement report received from the terminal apparatus 2 to the measurement information managing section 11.

The measurement information managing section 11 is configured to, when notified from the control section 13 that the terminal apparatus 2 is using band aggregation, output a measurement report to the judgment processing section for band-aggregation 15. The measurement information managing section 11 is also configured to, when nothing is notified from the control section 13 or when notified that the terminal apparatus 2 is using only one component carrier, output a measurement report to the normal judgment processing section 16.

The normal judgment processing section 16 of the handover judgment processing section 12 is provided with a function of judging whether or not to perform handover of the terminal apparatus 2 on the basis of a measurement report inputted from the measurement information managing section 11 and information inputted from the control section 13. In comparison, the judgment processing section for band-aggregation 15 of the handover judgment processing section 12 is provided with a function of judging whether or not to perform handover of the terminal apparatus 2 on the basis of a measurement report inputted from the measurement information managing section 11 and information inputted from the control section 13. This handover judgment processing section 12 corresponds to handover control means of the present invention.

The control section 13 outputs control information for communicating measurement configuration to the terminal apparatus 2 or reference signal schedule information to the transmission section 14. The control section 13 is provided with a function of, when the terminal apparatus 2 is performing band aggregation, notifying the measurement information managing section 11 that the terminal apparatus 2 is performing band aggregation. When the terminal apparatus 2 is using only one component carrier, this control section 13 may notify the measurement information managing section 11 that the terminal apparatus 2 is using only one component carrier. The transmission section 14 is provided with a function of sending a reference signal or control information on the basis of schedule information.

Description will be made on the operation of the wireless communication system 1 configured as described above, with reference to drawings. Description will be made here mainly on handover control, which is a characteristic operation of the present invention.

(Operation of the Whole System)

Figure 4:
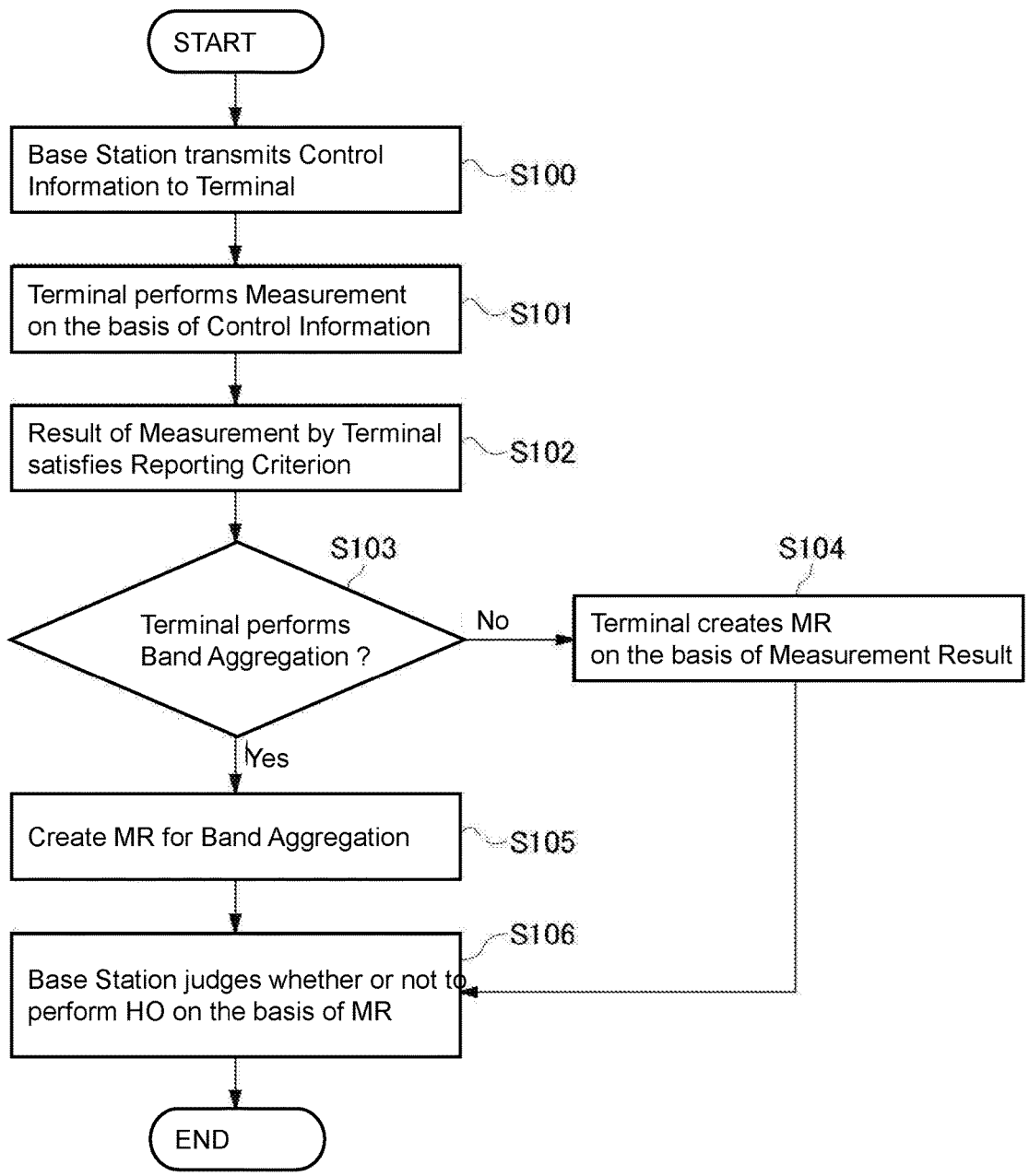
FIG. 4 is a flowchart showing the flow of handover control in the first embodiment.

First, the operation of the whole system of the wireless communication system 1 in the first embodiment will be described with reference to FIG. 4. FIG. 4 is a flowchart showing the flow of the operation performed when handover control is performed in the wireless communication system 1 of this embodiment. First, the base station 3 sends control information to the terminal apparatus 2 (S100), and the terminal apparatus 2 performs measurement of a reference signal on the basis of the control information (S101), as shown in FIG. 4. If the result of the measurement satisfies the criterion for reporting to the base station 3 decided in the control information (S102), the terminal apparatus 2 judges whether or not the terminal apparatus 2 is performing band aggregation (S103). If the terminal apparatus 2 is using only one component carrier (if the terminal apparatus 2 is not performing band aggregation), the terminal apparatus 2 sets a measurement report which is created from the measurement result and transmits it to the base station 3 (S104). On the other hand, if the terminal apparatus 2 is performing band aggregation (if the terminal apparatus 2 is using multiple component carriers), the terminal apparatus 2 sets a measurement report for band aggregation which is created from the measurement result and transmits it to the base station 3 (S105). The base station 3 judges whether or not to perform handover, from the measurement report sent from the terminal apparatus 2 (S106).

(Operation of Control Section of Terminal Apparatus)

Figure 5:
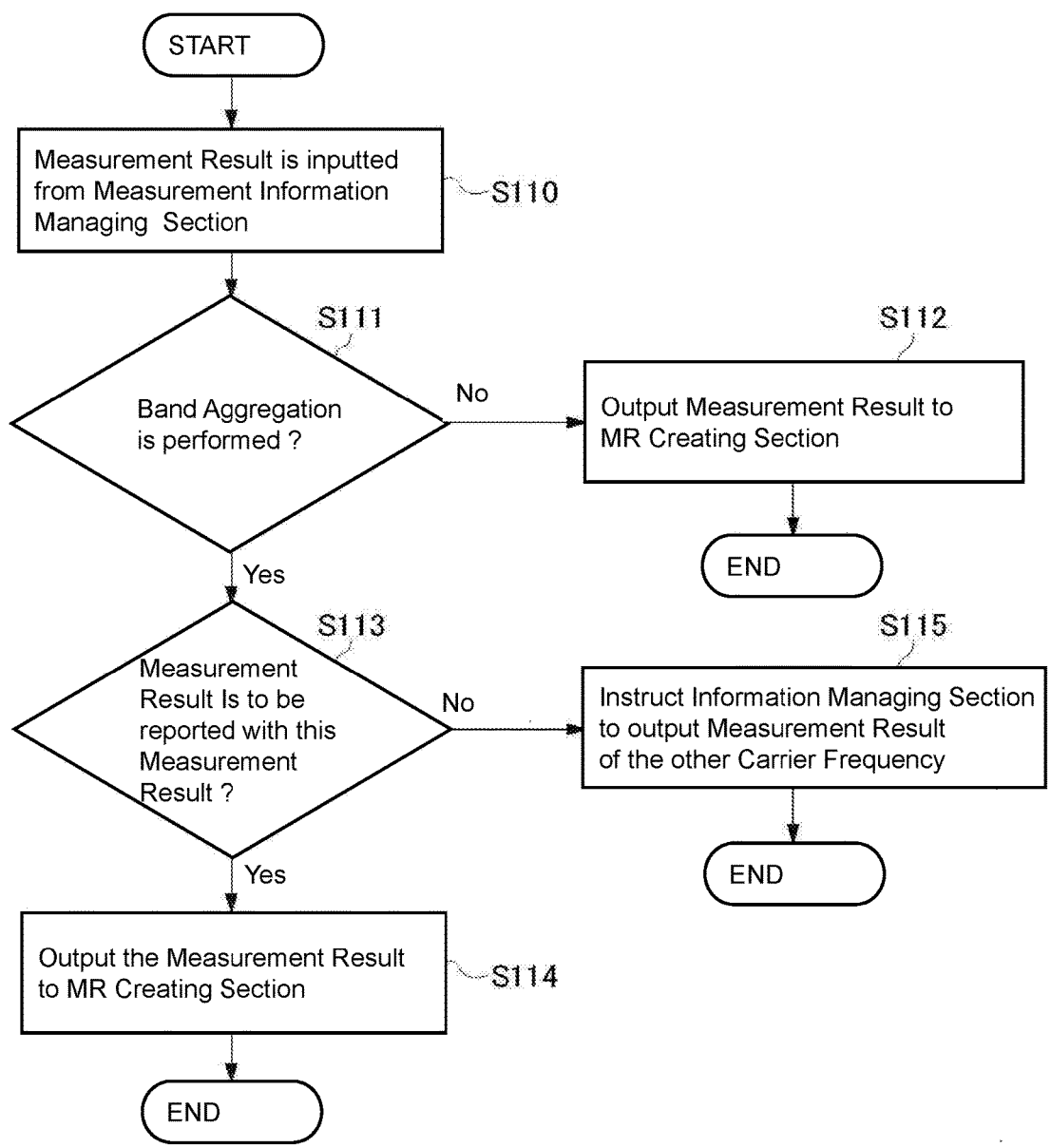
FIG. 5 is a flowchart showing an example of the operation of a control section of the terminal apparatus in the first embodiment.

Next, the operation of the control section 6 of the terminal apparatus 2 in the first embodiment will be described with reference to FIG. 5. FIG. 5 is a flowchart showing an example of the operation of the control section 6 performed when an event causing a measurement report occurs in the terminal apparatus 2 and a measurement result is outputted from the measurement information managing section 5. As shown in FIG. 5, when a measurement result is inputted from the measurement information managing section 5 (S110), the control section 6 judges whether or not the terminal apparatus 2 is performing band aggregation (S111). If the terminal apparatus 2 is not performing band aggregation, that is, if the terminal apparatus 2 is using only one component carrier, the control section 6 outputs the measurement result to the measurement report creating section 7 (S112).

If the terminal apparatus 2 is performing band aggregation, that is, if the terminal apparatus 2 is using two component carriers, the control section 6 judges whether to create a measurement report on the basis of a measurement result of the carrier frequency of one component carrier or to create the measurement report by adding a measurement result of the carrier frequency of one component carrier to the measurement result of the carrier frequency of the other component carrier (S113). The judgment criterion to be used then may be sent from the base station 3 to the terminal apparatus 2, or judgment criterion included in control information sent from the base station 3 may be used. Furthermore, the judgment criterion may be set in the terminal apparatus 2 in advance or may be generated by the terminal apparatus 2 according to circumstance.

Here, this judgment (S113) will be described in more detail by giving a concrete example. For example, in the case where band aggregation is performed only within one band, such as in the case where only a 800-MHz band component carrier is used for band aggregation (or in the case where only a 2-GHz carrier is used for band aggregation), it is judged that a measurement report is to be created on the basis of only a measurement result of the carrier frequency of one component carrier. On the other hand, in the case where a 800-MHz band component carrier and a 2-GHz band component carrier are used for band aggregation, it is judged that a measurement report is to be created by adding a measurement result of one carrier frequency to a measurement result of the other carrier frequency.

In another example, for example, if the component carriers used for band aggregation have adjacent carrier frequencies, it is judged that a measurement report is to be created on the basis of only a measurement result of the carrier frequency of one component carrier. On the other hand, if the component carriers used for band aggregation are not adjacent to each other, it is judged that a measurement report is to be created by adding a measurement result of one carrier frequency to a measurement result of the other carrier frequency.

In still another example, for example, if carrier frequency difference between component carriers used for band aggregation is equal to or less than x MHz (for example, x=20), it is judged that a measurement report is to be created on the basis of only a measurement result of the carrier frequency of one component carrier. On the other hand, if the carrier frequency difference between the component carriers used for band aggregation is more than x MHz (for example x=20), it is judged that a measurement report is to be created by adding a measurement result of one carrier frequency to a measurement result of the other carrier frequency.

In still another example, for example, if a neighbor cell with a quality equal to or above a criterion is included when the criterion is smaller than s-measure (a threshold to be a criterion for starting measurement) in a measurement result of one carrier frequency by a value x dB (for example, x=10), then it is judged that a measurement report is to be created on the basis of only a measurement result of the carrier frequency of the one component carrier. If there is not a cell satisfying this criterion, it is judged that a measurement report is to be created by adding a measurement result of one carrier frequency to a measurement result of the other carrier frequency. The value of x may be a negative value.

In still another example, for example, if a measurement result of one carrier frequency includes a neighbor cell having a quality equal to or above a criterion when the criterion is x dB (for example x=−10), then it is judged that a measurement report is to be created on the basis of only a measurement result of the carrier frequency of the one component carrier. If there is not a cell satisfying this criterion, it is judged that a measurement report is to be created by adding a measurement result of one carrier frequency to a measurement result of the other carrier frequency.

In still another example, for example, if a measurement result of one carrier frequency includes a measurement result of a component carrier to which it can be judged to perform handover (for example, an anchor carrier or a component carrier having the best received quality among component carriers used by the terminal), it is judged that a measurement report is to be created on the basis of only a measurement result of the carrier frequency of the one component carrier. If a measurement result of one carrier frequency does not include a measurement result of a component carrier to which it can be judged to perform handover (for example, an anchor carrier or a component carrier having the best received quality among component carriers used by the terminal), it is judged that a measurement report which includes a measurement result of a component carrier to which it can be judged to perform handover (for example, an anchor carrier or a component carrier having the best received quality among component carriers used by the terminal) is to be created.

If it is judged to set a measurement report which is created from only the measurement result of the carrier frequency of one component carrier, as a result of this judgment (S113), the control section 6 outputs the measurement result to the measurement report creating section 7 (S114). On the other hand, if it is judged, as a result of this judgment (S113), that a measurement report is to be created by adding the measurement result of the carrier frequency of one carrier component to the measurement result of the carrier frequency of the other component carrier, the control section 6 instructs the information managing section to output the measurement result of the other carrier frequency (S115).

Here, the judgment criterion of a measurement result of the other carrier frequency to be included in a measurement report will be described in more detail by giving a concrete example. For example, it is assumed that, when the terminal apparatus 2 is performing band aggregation using the carrier frequencies f1 and f2, a trigger (event) for creating a measurement report occurs at the carrier frequency f1. At this time, some cells (for example, five cells) are selected from among cells of the carrier frequencies f1 and f2, in order of quality with a cell having the best quality at the top, irrespective of whether the carrier frequency is f1 or f2, and made to be a measurement result.

Because cell identities (physical cell identities (PCIs)) included in the measurement result then are assigned within a frequency in a manner that neighbor cells do not have the same identities, there may be a case where neighbor cells have the same identities when the frequency changes. Therefore, at the time of creating a measurement report, the measurement report creating section 7 creates the measurement report by providing separators to indicate which frequency each cell has.

Figure 6:
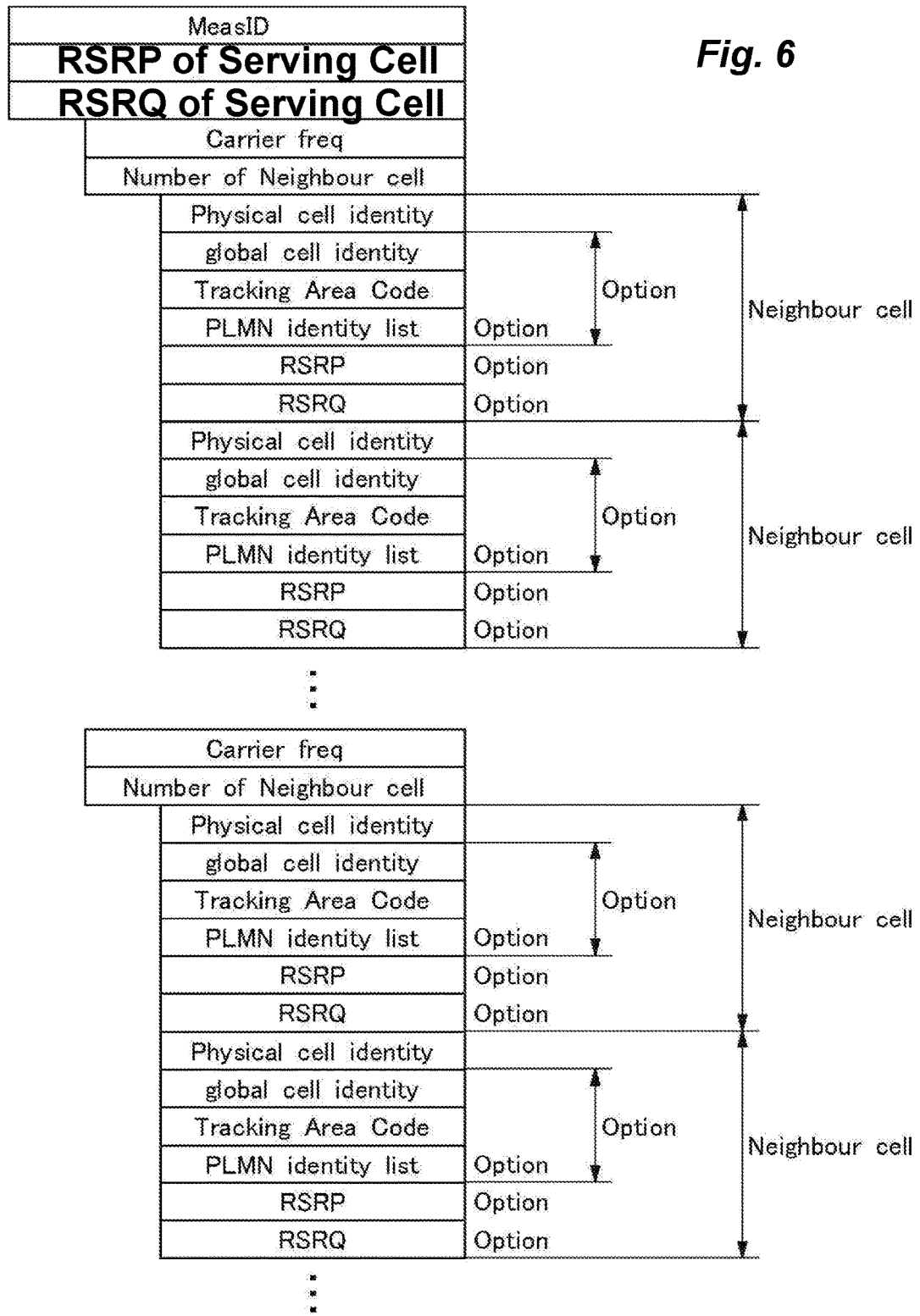
FIG. 6 is a diagram showing an example of a measurement report which includes frequency information about cells.

FIG. 6 is a diagram showing an example of a measurement report which includes frequency information about cells. In the example in FIG. 6, after RSRQ information about a serving cell before putting information about a neighbor cell, carrier frequency information about the neighbor cell is put, and the number of pieces of information about neighbors with the carrier frequency to be included in the measurement report is shown. Thereby, the base station 3 can judge which frequency the cells of the information belong to.

In another example, it is possible to determine the number of cells (for example, two) of the other carrier frequency to be included into a measurement result in advance and include the number of cells corresponding to the number. In still another example, it is also possible to determine a threshold of the absolute value or the relative value in advance and include such a cell with the other carrier frequency that exceeds the threshold value into a measurement result (for example, include a cell exceeding −30 dBm, among cells with the other carrier frequency, into the measurement result). In still another example, it is also possible to give an offset to each carrier frequency, select some cells in order of quality with a cell having the best quality at the top in consideration of the offset, and include them into a measurement result.

In still another example, when the terminal is performing band aggregation using the carrier frequencies f1 and f2, an indication to compare the qualities of cells of f1 and cells of a carrier frequency f3 which is not used for the band aggregation to make an event judgment has been given from the base station. In this case, if the criterion for sending a measurement report are satisfied as a result of the event judgment, such cells that satisfy the event criterion at f3, the serving cells of f1, and y cells (for example, y=1) regarded as having a good quality at f2 for which event judgment has not been performed and which is being used for the band aggregation may be selected and included into a measurement result.

In still another example, it is also possible to, if the criterion for sending a measurement report is satisfied at f1 as a result of event judgment when the terminal is performing band aggregation using the carrier frequencies f1 and f2, select a component carrier which the terminal uses and to which it can be judged to perform handover (for example, an anchor carrier or a component carrier having the best received quality among component carriers used by the terminal) and include it into a measurement result. For example, if the component carrier from which it can be judged to perform handover is f2 when an event of setting a serving cell to f1 is judged at the carrier frequency f1, the received quality of the component carrier of f2, among the component carriers used by the terminal, is included into a measurement report. Thereby, the base station can obtain information from which it can be judged to perform handover as early as possible and, therefore, start a handover procedure early. By including the received quality of the best component carrier, the base station can easily judge whether or not the terminal had better continue using the set of component carriers.

In the case where coverage differs among frequencies, the effect is enhanced if the amount of interference differs. The terminal may include the received quality of a component carrier from which it can be judged to perform handover (for example, an anchor carrier or a component carrier having the best received quality among components carriers used by the terminal) into a measurement report even if nothing is notified from the base station.

The terminal may include the received quality of a component carrier from which it can be judged to perform handover (for example, an anchor carrier or a component carrier having the best received quality among components carriers used by the terminal) into a measurement report only when there is a notification from the base station.

When a measurement result of the other carrier frequency is inputted from the measurement information managing section 5, the control section 6 outputs a measurement result of the carrier frequency of one component carrier and the measurement result of the other carrier frequency to the measurement result reducing section 9. Moreover, at this time, it is possible to output the information that the measurement result of the other carrier frequency is included, to the measurement result reducing section 9.

If information required for reducing a cell in a measurement result is sent from the base station 3, this control section 6 inputs the information to the measurement result reducing section 9 without change. For example, when a policy for deciding handover or a policy for deciding s-measure (hereinafter also referred to simply as a "policy") is sent from the base station 3 as control information, the control section 6 inputs the policy to the measurement result reducing section 9. Furthermore, if the base station 3 creates a judgment criterion from the policy, and the judgment criterion is sent to the terminal apparatus 2 as control information, the control section 6 inputs the judgment criterion to the measurement result reducing section 9.

(Operation of Measurement Result Reducing Section of Terminal Apparatus)

Figure 7:
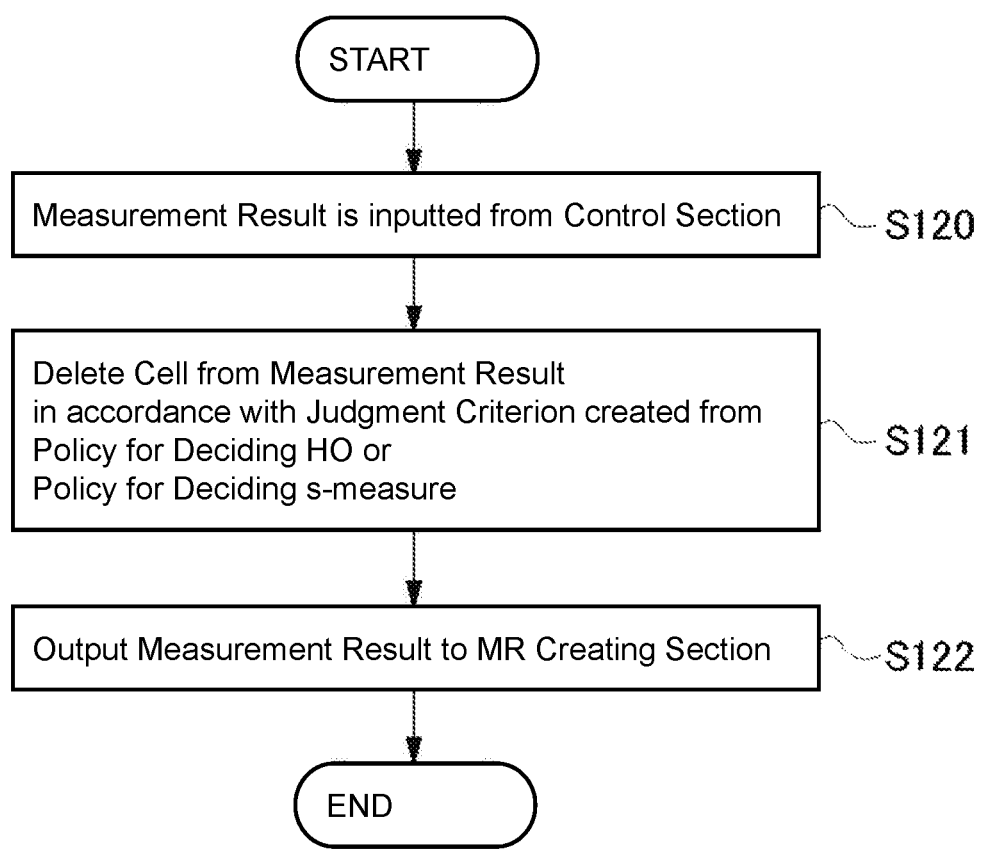
FIG. 7 is a flowchart showing an example of the operation of a measurement result reducing section in the first embodiment.

Next, the operation of the measurement result reducing section 9 of the terminal apparatus 2 in the first embodiment will be described with reference to FIG. 7. FIG. 7 is a flowchart showing an example of the operation of the measurement result reducing section 9. As shown in FIG. 7, when a measurement result is inputted from the control section 6 (S120), the measurement result reducing section 9 deletes a cell from the measurement result on the basis of a judgment criterion created from a policy (S121). As for this judgment criterion, the judgment criterion itself may be inputted from the control section 6, or the judgment criterion itself may be held in the measurement result reducing section 9 in advance. This judgment criterion may be generated from a policy inputted from the control section 6 or may be generated from a policy held in the measurement result reducing section 9 in advance. The measurement result reducing section 9 selects a cell to be included in a measurement report on the basis of such a judgment criterion.

Here, selection of a cell on the basis of a judgment criterion generated from a policy will be described in more detail by giving a concrete example. The judgment criterion generated from a policy is for selecting a cell with a high probability of being used for handover. For example, when the carrier frequencies f1 and f2 are used, and the number of cells with the carrier frequency f1 and the number of cells with the carrier frequency f2 are eight and two, respectively, that is, there is a large difference between the number of cells with the carrier frequency f1 and the number of cells with the carrier frequency f2, the number of the cells in a measurement result is decreased by decreasing the number of cells with the carrier frequency f1 by three in order of quality with a worst-quality cell at the top. Alternatively, for example, five cells are selected from among the cells with the carrier frequency f1 and the cells with the carrier frequency f2 in order of quality with a best-quality cell at the top so that the total of five cells are included in a measurement result, and the five cells are included into the measurement result.

Then, the measurement result reducing section 9 outputs the measurement result of selection of cells to the measurement report creating section 7 (S122). A policy is for limiting a cell to be selected for handover. Therefore, by the terminal apparatus 2 limiting cells to be selected, using this policy, it is possible to decrease unnecessary cells for handover from a measurement report and reduce the size of the measurement report.

According to this wireless communication system 1 of the first embodiment of the present invention, it is possible to, by providing the measurement report creating section 7 which creates a measurement report including information indicting radio conditions of cells with a frequency at which an event causing transmission of a measurement result occurred and cells with a frequency different from the frequency, for the terminal apparatus 2, shorten time required for handover in the wireless communication system 1 in which the base station 3 and the terminal apparatus 2 are communicable with each other.

The wireless communication system 1 of this embodiment is the wireless communication system 1 in which a base station apparatus 3 and a terminal apparatus 2 are communicable with each other using multiple frequencies; and the system is configured so that the terminal apparatus 2 is provided with: a measurement information managing section 5 that detects occurrence of an event for transmitting a measurement report of a radio condition of a cell at a frequency set for the base station apparatus 3, to the base station 3 communicating with the terminal apparatus; a measurement report creating section 7 that creates the measurement report including information indicating radio conditions of the cells at a frequency at which the event occurred and at another different frequency, on the basis of occurrence of the event; and the base station apparatus 3 is provided with: a handover judgment processing section 12 that controls whether or not to perform handover to another cell of the terminal apparatus 2 on the basis of the measurement report transmitted from the terminal apparatus 2.

Due to this configuration, when an event occurs in the terminal apparatus 2 at a frequency set for the base station 3, a measurement report including information indicating radio conditions of cells at the frequency at which the event occurred and at another different frequency is transmitted from the terminal apparatus 2 to the base station 3, and it is controlled whether or not to perform handover of the terminal apparatus 2 on the basis of the measurement report. Thus, even in the wireless communication system 1 in which the base station apparatus 3 and the terminal apparatus 2 are communicable with each other using multiple frequencies, the base station 3 can quickly decide whether or not to perform handover of the terminal apparatus 2 on the basis of only the measurement report. Thereby, in the wireless communication system 1 in which the base station apparatus 3 and the terminal apparatus 2 are communicable with each other using multiple frequencies, time required for handover is shortened.

In the wireless communication system 1 of this embodiment, the measurement report creating section 7 is configured to select a part of a measurement report of the radio conditions of cells at a frequency at which an event occurred and a part of a measurement report of the radio conditions of cells at another frequency, as information indicating the radio conditions of the cells at the frequency at which the even occurred and information indicating the radio conditions of the cells at that another frequency.

Due to this configuration, a part of a measurement report of the radio conditions of cells at a frequency at which an event occurred and a part of a measurement report of the radio conditions of cells at another frequency are selected as information indicating the radio conditions of the cells at the frequency at which the event occurred and information indicating the radio conditions of the cells at that another frequency. Therefore, in comparison with the case of including all the measurement reports of the radio conditions of the cells at the frequency at which the event occurred and the cells at that another frequency, the data size of the measurement report to be transmitted from the terminal apparatus 2 to the base station 3 can be reduced, and it becomes possible to reduce the amount of traffic.

It is also conceivable to introduce additional measurement identities which have been conventionally used in a UMTS (universal mobile telecommunication system) to include a measurement result of another frequency into a measurement report. In the UMTS, there is a setting item of "additional measurement identities" at the time of performing measurement configuration. The "additional measurement identities" indicates a reference list of other measurements. When a measurement report for the measurement is sent, the reporting quantity (measurement result) of a referred measurement can be included. However, if this "additional measurement identities" is simply introduced, multiple measurement results for independent measurement configuration are included in a measurement report. Consequently, the size of the measurement report increases, and the amount of traffic increases. In comparison with this method, it is possible, in the wireless communication system 1 of this embodiment, to reduce the data size of a measurement report transmitted from the terminal apparatus 2 to the base station 3 and reduce the amount of traffic.

Furthermore, in the wireless communication system 1 of this embodiment, the terminal apparatus 2 is configured to be provided with the control section 6 which judges whether or not to create a measurement report including information indicating the radio conditions of cells at a frequency at which an event occurred and cells at another frequency.

Due to this configuration, if it is not judged that a measurement report including information indicating the radio conditions of cells at a frequency at which an event occurred and cells at another frequency should be created, only a measurement report of the radio conditions of the cells at the frequency at which the event occurred is transmitted to the base station 3. Thereby, if it is judged that information indicating the radio conditions of cells at another frequency is unnecessary, only necessary information is transmitted. Thus, it is possible to reduce the data size of a measurement report transmitted from the terminal apparatus 2 to the base station 3 and reduce the amount of traffic.

Furthermore, in the wireless communication system 1 of this system, a policy for deciding a cell selected as a candidate for performing handover, among other multiple cells, is set in the terminal apparatus 2, and the measurement report creating section 7 is configured to select a measurement report of a cell selected as the candidate on the basis of the policy among measurement reports of the other multiple cells, as information indicating the wave radio conditions of cells at a frequency at which an event occurred and at another frequency.

Due to this configuration, a measurement report of a cell selected as a candidate for performing handover, among other multiple cells, on the basis of a handover policy set in the terminal apparatus 2 is selected as information indicating the radio conditions of other multiple cells. Therefore, in comparison with the case of including all the measurement reports of the radio conditions of the other multiple cells, the data size of the measurement report to be transmitted from the terminal apparatus 2 to the base station 3 can be reduced, and it becomes possible to reduce the amount of traffic. The policy may be set in the terminal apparatus 2 in advance or may be received from the base station 3 and set in the terminal apparatus 2.

Second Embodiment

Next, the wireless communication system 1 of a second embodiment of the present invention will be described. Here, description will be made mainly on a point in which the wireless communication system 1 of this embodiment is different from the first embodiment. Therefore, the configuration and operation of this embodiment are similar to those of the first embodiment unless otherwise especially referred to.

In this embodiment, the operation of the control section 6 performed when an event causing a measurement report occurs in the terminal apparatus 2 and a measurement result is outputted from the measurement information managing section 5 is different from that of the first embodiment. Therefore, the operation of the control section 6 of the terminal apparatus 2 in the second embodiment will be described here with reference to drawings.

Figure 8:
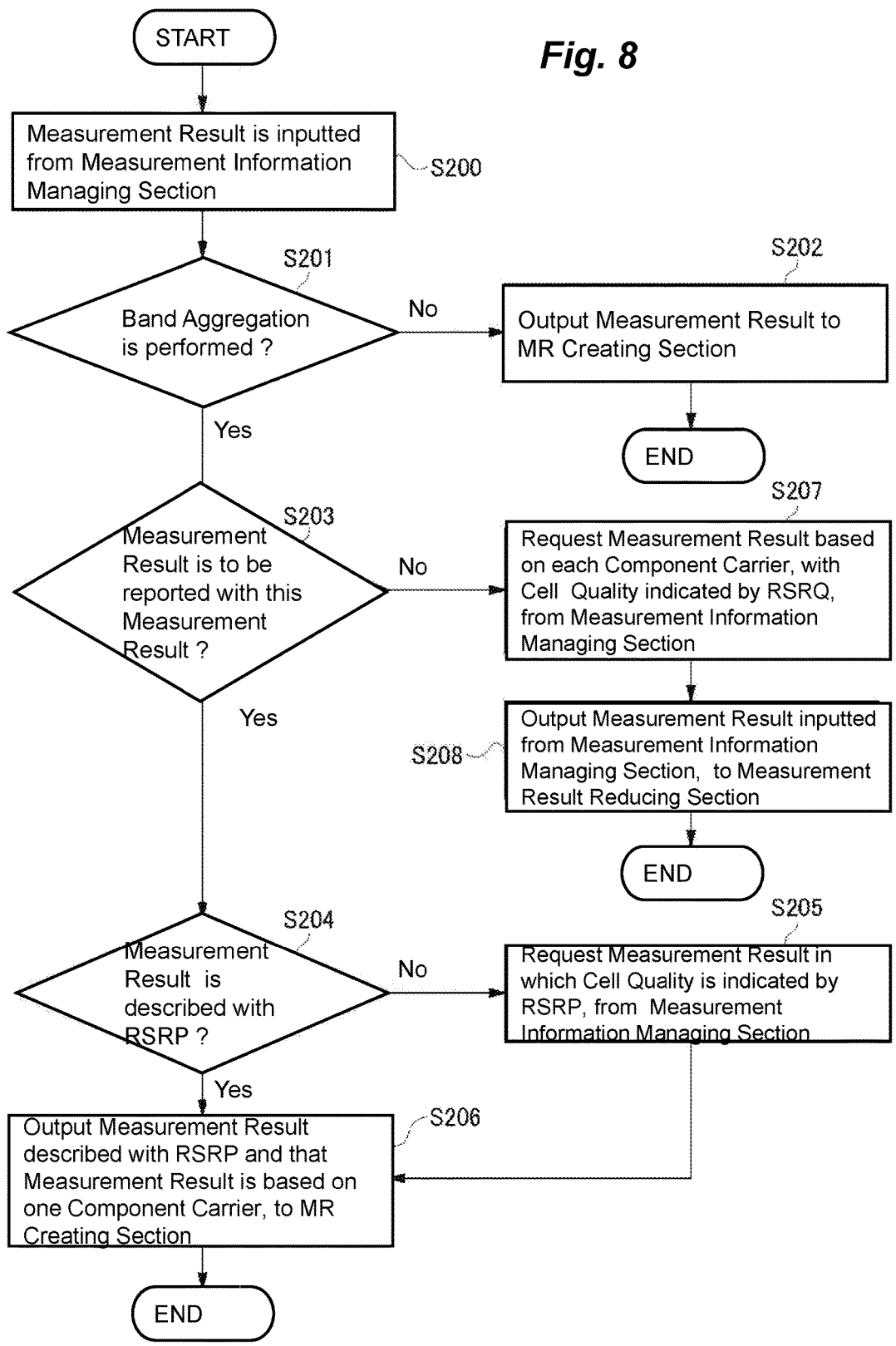
FIG. 8 is a flowchart showing an example of the operation of a control section of a terminal apparatus in a second embodiment.

FIG. 8 is a flowchart showing an example of the operation of the control section 6 performed when an event causing a measurement report occurs in the terminal apparatus 2 and a measurement result is outputted from the measurement information managing section 5. As shown in FIG. 8, when a measurement result is inputted from the measurement information managing section 5 (S200), the control section 6 judges whether or not the terminal apparatus 2 is performing band aggregation (S201). If the terminal apparatus 2 is not performing band aggregation, that is, if the terminal apparatus 2 is using only one component carrier, the control section 6 outputs the measurement result to the measurement report creating section 7 (S202).

If the terminal apparatus 2 is performing band aggregation, that is, if the terminal apparatus 2 is using two component carriers, the control section 6 judges whether to create a measurement report on the basis of a measurement result of the carrier frequency of one component carrier or to create the measurement report by adding a measurement result of the carrier frequency of one component carrier to the measurement result of the carrier frequency of the other component carrier (S203). The way of judgment and the judgment criterion are similar to those of the first embodiment.

The control section 6 performs control so that a measurement result in which cell quality is indicated by RSRP is sent to the base station 3 if it is judged that a measurement report is to be created on the basis of only a measurement result of the carrier frequency of one component as a result of this judgment, and a measurement result in which cell quality is indicated by RSRQ is sent to the base station 3 if it is judged that a measurement report is to be created, with a measurement result of the other carrier frequency included. In this case, it can be said that the measurement report creating section 7 is controlled to create a measurement result in which cell quality is indicated by RSRP if it is judged that a measurement report is to be created on the basis of only a measurement result of the carrier frequency of one component as a result of this judgment and create a measurement result in which cell quality is indicated by RSRQ if it is judged that a measurement report is to be created, with a measurement result of the other carrier frequency included.

Figure 9:
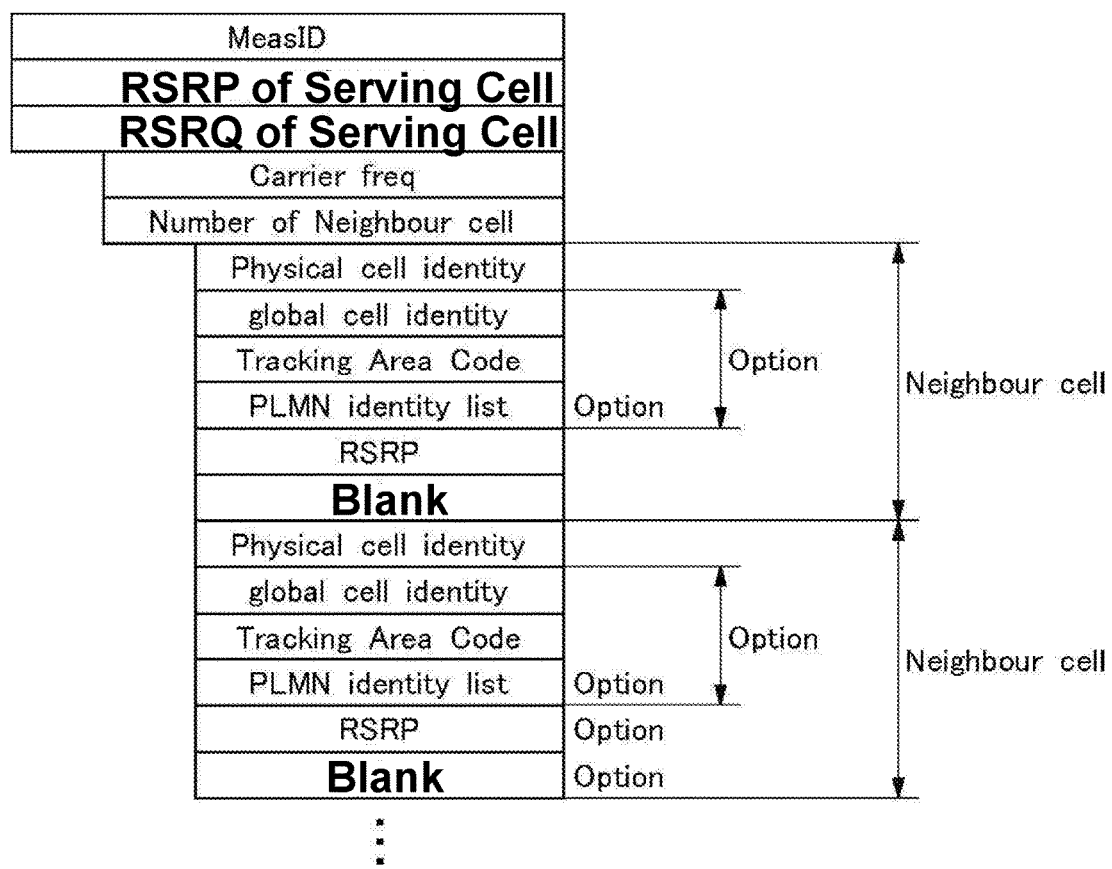
FIG. 9 is a diagram showing an example of a measurement report in which cell quality is indicated by RSRP.
Figure 10:
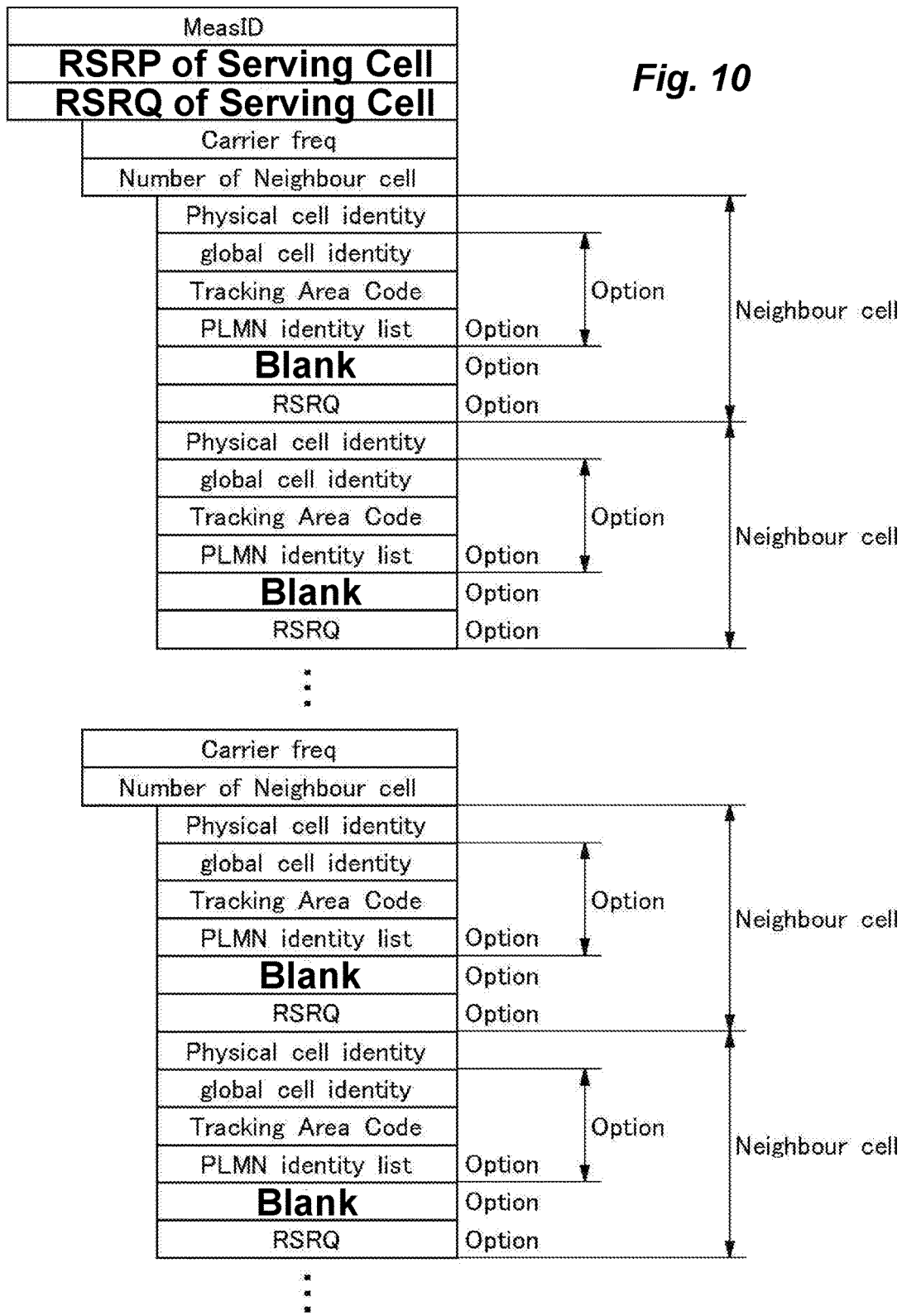
FIG. 10 is a diagram showing an example of a measurement report in which cell quality is indicated by RSRQ.

Here, concrete examples of a measurement report in which cell quality is indicated by RSRP and a measurement report in which cell quality is indicated by RSRP will be shown with figures. FIG. 9 is a diagram showing an example of the measurement report in which cell quality is indicated by RSRP. As shown in FIG. 9, this measurement report includes RSRP information indicating cell quality and does not include RSRQ information. FIG. 10 is a diagram showing an example of the measurement report in which cell quality is indicated by RSRQ. As shown in FIG. 10, this measurement report includes RSRQ information indicating cell quality and does not include RSRP information. Thus, a measurement report including information indicating cell quality is created. The base station 3 cannot change the format of a measurement report so as to make the contents of the measurement report understandable. However, by causing information used for indicating cell quality to differ by using RSRP and RSRQ, the condition at another frequency can be communicated to the base station 3 (without changing the measurement report format).

If it is judged that a measurement report is to be created on the basis of only a measurement result of the carrier frequency of one component carrier, as a result of the above judgment (S203), the control section 6 confirms whether cell quality is described with RSRP (S204). If the cell quality is not described with RSRP, the control section 6 instructs the measurement information managing section 5 to output a measurement result in which the cell quality is indicated by RSRP, and acquires the measurement result in which the cell quality is described with RSRP (S205). Then, the control section 6 outputs the measurement result in which the cell quality is described with RSRP to the measurement report creating section 7 (S206). On the other hand, if the cell quality is described with RSRP, the control section 6 outputs the measurement result to the measurement report creating section 7 (S206). The control section 6 may output that it is the measurement result of the carrier frequency of one component carrier, to the measurement report creating section 7 then.

On the other hand, if it is judged, as a result of the above judgment (S203), that a measurement result of the other carrier frequency is to be included into a measurement report, the control section 6 instructs the measurement information managing section 5 to output a measurement result of the carrier frequency of the one component carrier and a measurement result of the other carrier frequency as RSRQ and acquires the measurement results in which cell quality is described with RSRQ (S207). Then, when the measurement result of each carrier frequency is inputted from the measurement information managing section 5, the control section 6 outputs the inputted measurement results to the measurement result reducing section 9 (S208). The control section 6 may output that it is the measurement result of each carrier frequency, to the measurement result reducing section 9 then.

In this embodiment, the operation of the handover judgment processing section 12 of the base station 3 performed when a measurement report as described above is received from the terminal apparatus 2 is different from that of the first embodiment.

If cell quality is described as RSRP in an inputted measurement report, the judgment processing section for band-aggregation 15 of the handover judgment processing section 12 judges whether or not to perform handover using the same frequencies as the carrier frequencies used by the terminal apparatus 2 (intra-frequency handover) to another cell, on the basis of the measurement result. If the cell quality is described with RSRQ in the inputted measurement report, the judgment processing section for band-aggregation 15 judges whether or not to select an appropriate cell from among cells managed by one base station 3 and perform handover using the same frequencies as the carrier frequencies used by the terminal apparatus 2 (intra-frequency handover) or handover using carrier frequencies all or a part of which are different from the carrier frequencies used by the terminal apparatus 2 (inter-frequency handover) while performing band aggregation. This judgment processing section for band-aggregation may judge that the band aggregation should be ended, and handover should be performed to another base station 3.

Operations and advantages similar to those of the first embodiment can be obtained by the wireless communication system 1 of the second embodiment.

In the wireless communication system 1 of this embodiment, the measurement report creating section 7 is configured to create, if handover control should be performed on the basis of both of measurement reports of a frequency at which an event occurred and another frequency, a measurement report including information about the received quality (RSRQ) of radio waves from cells with these frequencies, and, if handover control should be performed on the basis of only the frequency at which the event occurred, create a measurement report including information about the received power (RSRP) of radio waves from cells with that frequency.

Due to this configuration, the base station 3 controls handover on the basis of both of measurement reports of a frequency at which an event occurred in the terminal apparatus 2 and another frequency if a measurement report received from the terminal apparatus 2 includes received quality information, and controls handover on the basis of only the measurement report of the frequency at which the event occurred in the terminal apparatus 2 if the measurement report received from the terminal apparatus 2 includes received power information. Thereby, on the basis of which of received quality information and received power is included in a measurement report, the base station 3 can quickly decide which frequency measurement report handover of the terminal apparatus 2 should be controlled on the basis of. Thereby, in the wireless communication system 1 in which the base station apparatus 3 and the terminal apparatus 2 are communicable with each other using multiple frequencies, time required for handover is shortened.

Thus, in this embodiment, since a measurement report transmitted from the terminal apparatus 2 includes information indicating whether a measurement result of the carrier frequency of one component carrier or a measurement result of the other carrier frequency is included, it is easy for the base station 3 to judge handover.

That is, in this embodiment, since the terminal apparatus 2 can include information required by the base station 3 for handover, into one measurement report at the time of performing band aggregation, the base station 3 can decide handover early. In the case where a measurement report is created from a measurement result which includes only cells on the basis of the carrier frequency of one component carrier, the base station 3 can judge handover only from RSRP out of consideration of interference power. On the other hand, in the case where a measurement report which includes a measurement result of another carrier frequency is created, the base station 3 can judge handover from RSRQ in consideration of interference power.

In this case, the number of bits required for transmission differs between RSRP and RSRQ. A smaller number of bits is required for RSRQ. Therefore, even in the case where a measurement report of another carrier frequency is included in a measurement report, and the number of cells included in the measurement report is increased, the size of the measurement report can be reduced.

Third Embodiment

Next, the wireless communication system 1 of a third embodiment of the present invention will be described. Here, description will be made mainly on a point in which the wireless communication system 1 of this embodiment is different from the first embodiment. Therefore, the configuration and operation of this embodiment are similar to those of the first embodiment unless otherwise especially referred to.

In this embodiment, the operation of the measurement result reducing section 9 performed when a measurement report is created is different from that of the first embodiment. Therefore, the operation of the measurement result reducing section 9 of the terminal apparatus 2 in the third embodiment will be described here with reference to drawings.

Figure 11:
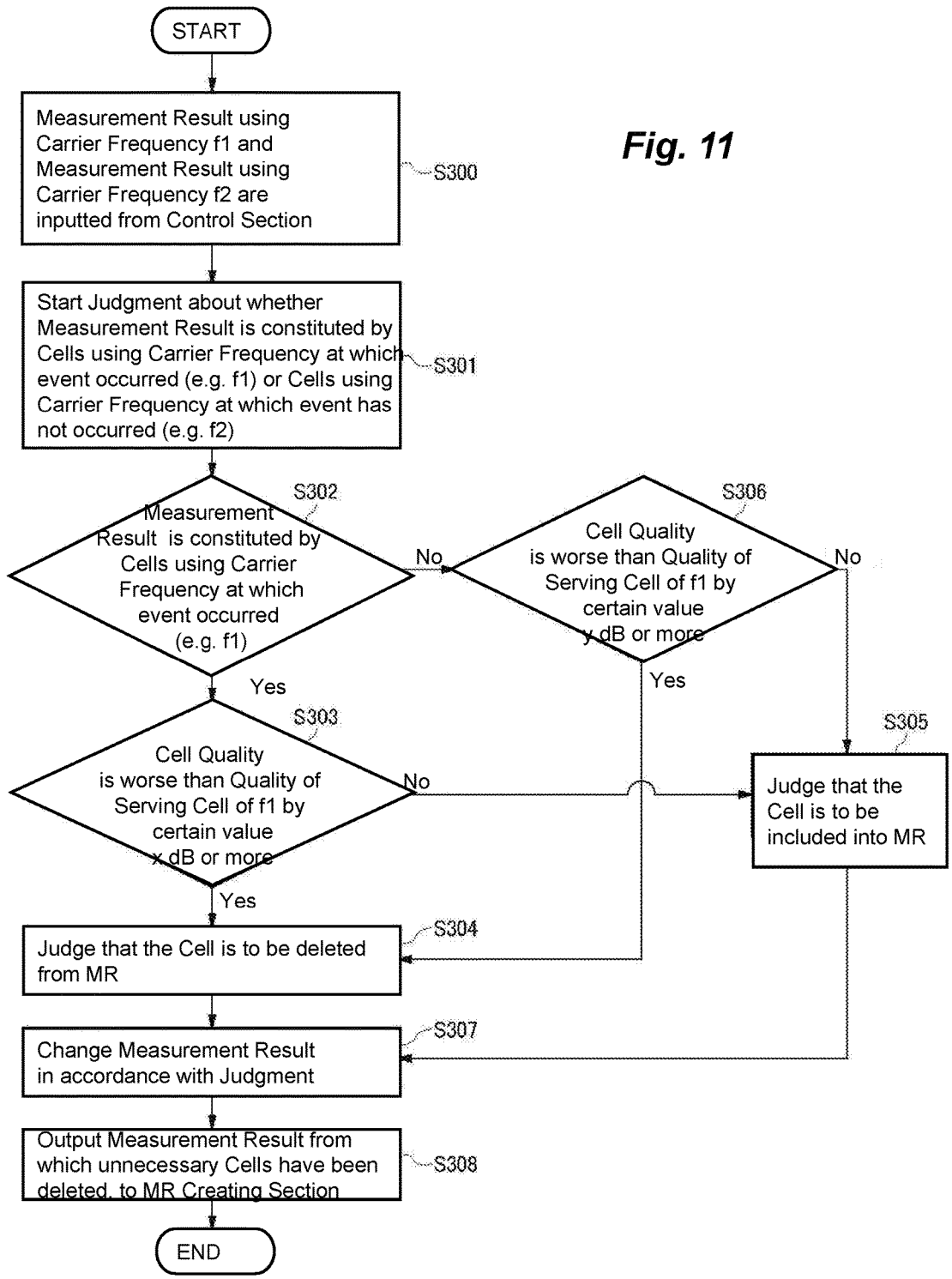
FIG. 11 is a flowchart showing the operation of a measurement result reducing section in a third embodiment.

FIG. 11 is a flowchart showing the operation of the measurement result reducing section 9 of the third embodiment. First, a measurement result constituted by cells using the carrier frequency of each component carrier is inputted to the measurement result reducing section 9 (S300), as shown in FIG. 11. Here, it is assumed that a measurement result constituted by cells using the carrier frequency f1 and a measurement result constituted by cells using the carrier frequency f2 are inputted. It is also assumed that an event causing transmission of a measurement report to the base station 3 occurs in a serving cell using the carrier frequency f1 then. The measurement result reducing section 9 starts judgment about whether the measurement result is constituted by cells using the carrier frequency f1 or by cells using the carrier frequency f2 (S301).

If it is judged that the measurement result is constituted by cells using the carrier frequency f1 at which the event occurred (S302), it is judged whether the cell quality is worse than the quality of the serving cell with the carrier frequency f1 by a certain value (x dB; for example, x=30) or more (S303). Such cells that are judged to have a worse quality are deleted from the measurement report (S304), and other cells are judged to be included into the measurement report (S305).

On the other hand, if it is judged that the measurement result is constituted by cells using the carrier frequency f2 at which an event has not occurred (S302), it is judged whether the cell quality is worse than the quality of the carrier frequency f1 by a certain value (y dB; for example, y=40) or more (S306). Such cells that are judged to have a worse quality are deleted from the measurement report (S304), and other cells are judged to be included into the measurement report (S305).

As described above, the measurement result is changed on the basis of a result of judging cells to be deleted from the measurement report and cells to be included into the measurement report (S307), and the measurement result from which unnecessary cells have been deleted, is outputted to the measurement report creating section 7 (S308).

Thus, by the measurement result reducing section 9 selecting cells to be included into a measurement report on the basis of the quality of a serving cell with a carrier frequency at which an event occurred, it is possible to select cells using the carrier frequency at which an event has occurred and cells using a carrier frequency at which an event has not occurred, using the same criterion.

By changing the quality difference from a serving cell from which it is judged whether or not to include a cell into a measurement report, between a carrier frequency at which an event has occurred and a carrier frequency at which an event has not occurred, it is possible to give priorities to cells to be included into the measurement report. It is also possible to equalize the quality difference from the serving cell between the carrier frequency at which an event has occurred and the carrier frequency at which an event has not occurred without changing it between the carrier frequencies.

Operations and advantages similar to those of the first embodiment can be obtained by the wireless communication system 1 of the third embodiment.

In the wireless communication system 1 of this embodiment, the measurement report creating section 7 is configured to select a measurement report of the radio condition of a cell judged to have a higher communication quality in comparison with a predetermined reference quality set at the frequency at which the event occurred.

Due to this configuration, a predetermined reference quality set at a frequency at which an event occurred and the communication quality of cells are compared, and a measurement report of the radio condition of a cell judged to have a high communication quality is selected as information indicating the radio condition of the cell. Thereby, only such useful information (a measurement report) is transmitted that the communication quality is judged to be high, with the frequency at which the event occurred used as a reference. That is, in this embodiment, it is possible for the terminal apparatus 2 to communicate a better cell to the base station 3. Furthermore, it is possible to reduce the data size of a measurement report transmitted from the terminal apparatus 2 to the base station 3 and reduce the amount of traffic. The reference quality may be set in the terminal apparatus 2 in advance or may be received from the base station 3 and set in the terminal apparatus 2.

Fourth Embodiment

Next, the wireless communication system 1 of a fourth embodiment of the present invention will be described. Here, description will be made mainly on a point in which the wireless communication system 1 of this embodiment is different from the first embodiment. Therefore, the configuration and operation of this embodiment are similar to those of the first embodiment unless otherwise especially referred to.

In this embodiment, the operation of the measurement result reducing section 9 performed when a measurement report is created is different from that of the first embodiment. Therefore, the operation of the measurement result reducing section 9 of the terminal apparatus 2 in the fourth embodiment will be described here with reference to drawings.

Figure 12:
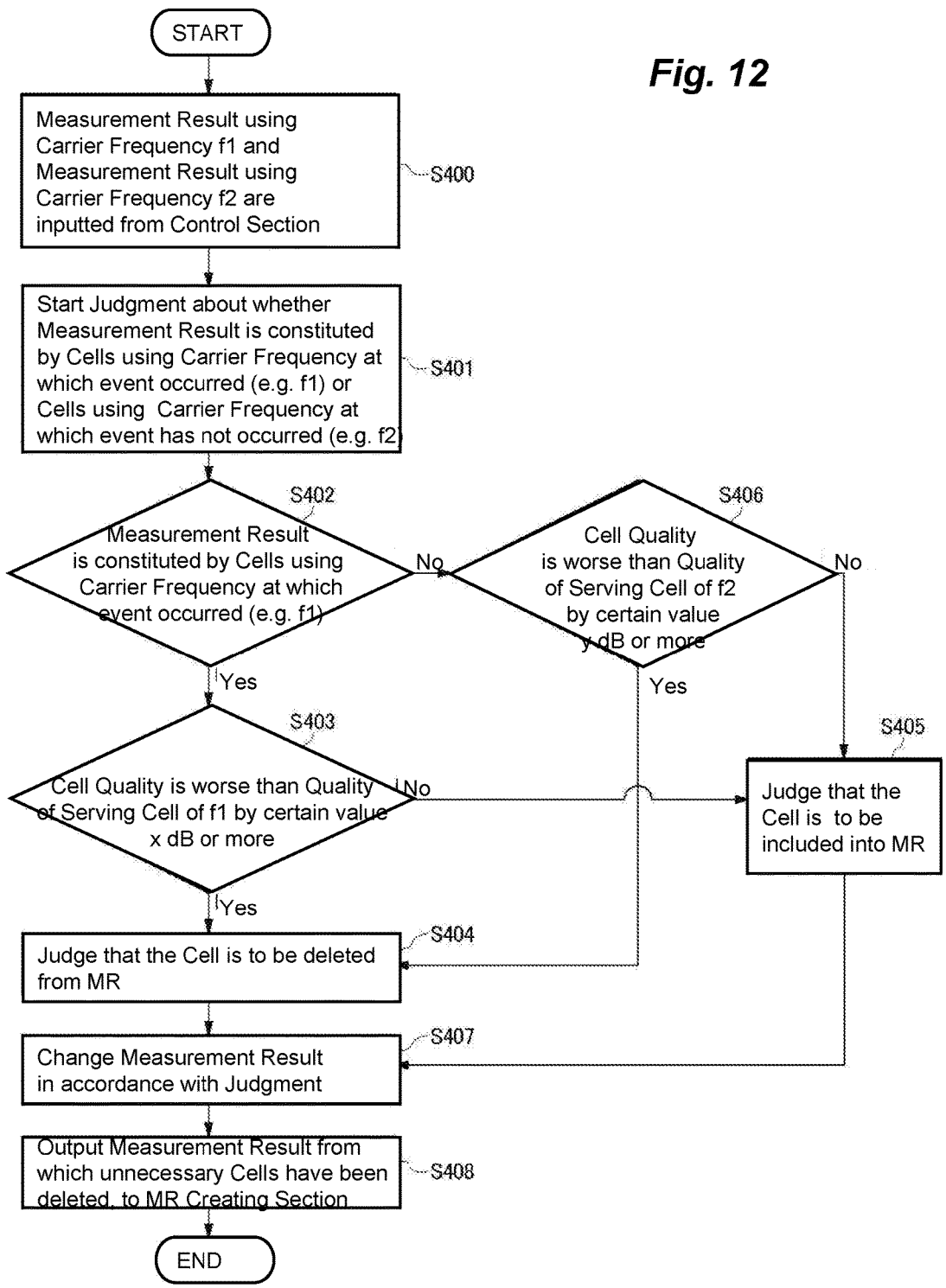
FIG. 12 is a flowchart showing the operation of a measurement result reducing section in a fourth embodiment.

FIG. 12 is a flowchart showing the operation of the measurement result reducing section 9 of the fourth embodiment. First, a measurement result constituted by cells using the carrier frequency of each component carrier is inputted to the measurement result reducing section 9 (S400), as shown in FIG. 12. Here, it is assumed that a measurement result measurement result constituted by cells using the carrier frequency f1 and a measurement result constituted by cells using the carrier frequency f2 are inputted. It is also assumed that an event causing transmission of a measurement report to the base station 3 occurs in a serving cell using the carrier frequency f1 then. The measurement result reducing section 9 starts judgment about whether the measurement result is constituted by cells using the carrier frequency f1 or by cells using the carrier frequency f2 (S401).

If it is judged that the measurement result is constituted by cells using the carrier frequency f1 at which the event occurred (S402), it is judged whether the cell quality is worse than the quality of the serving cell with the carrier frequency f1 by a certain value (x dB; for example, x=30) or more (S403). Such cells that are judged to have a worse quality are deleted from the measurement report (S404), and other cells are judged to be included into the measurement report (S405).

On the other hand, if it is judged that the measurement result is constituted by cells using the carrier frequency f2 at which an event has not occurred (S402), it is judged whether the cell quality is worse than the quality of a serving cell with the carrier frequency f2 by a certain value (y dB; for example, y=40) or more (S406). Such cells that are judged to have a worse quality are deleted from the measurement report (S404), and other cells are judged to be included into the measurement report (S405).

From a result of judging cells to be deleted from the measurement report and cells to be included into the measurement report as described above, the measurement result is changed (S407), and the measurement result from which unnecessary cells have been deleted, is outputted to the measurement report creating section 7 (S408).

By the measurement result reducing section 9 selecting cells to be included into a measurement report on the basis of quality difference from a serving cell, for each carrier frequency, it is possible to create a measurement report from which the base station 3 can judge handover on the basis of the conditions of carrier frequencies being used.

By changing the quality difference from a serving cell from which it is judged whether or not to include a cell into a measurement report, between a carrier frequency at which an event has occurred and a carrier frequency at which an event has not occurred, it is possible to give priorities to cells to be included into the measurement report. It is also possible to equalize the quality difference from the serving cell between the carrier frequency at which an event has occurred and the carrier frequency at which an event has not occurred without changing it between the carrier frequencies.

Operations and advantages similar to those of the first embodiment can be obtained by the wireless communication system 1 of the fourth embodiment.

In the wireless communication system 1 of this embodiment, the measurement report creating section 7 is configured to select a measurement report of the radio condition of a cell judged to have a higher communication quality in comparison with a predetermined reference quality set for each frequency being used for communication.

Due to this configuration, the communication qualities of cells are compared at each frequency being used for communication, and a measurement report of the radio condition of a cell judged to have a high communication quality is selected as information indicating the radio condition of the cell. Thereby, only such useful information that the communication quality is judged to be high, with the frequency at which an event occurred used as a reference, and such useful information that the communication quality is judged to be high, with another frequency as a reference (a measurement report) are transmitted. That is, in this embodiment, it is possible for the terminal apparatus 2 to communicate a better cell to the base station 3. Furthermore, it is possible to reduce the data size of a measurement report transmitted from the terminal apparatus 2 to the base station 3 and reduce the amount of traffic. The reference quality may be set in the terminal apparatus 2 in advance or may be received from the base station 3 and set in the terminal apparatus 2.

Fifth Embodiment

Next, the wireless communication system 1 of a fifth embodiment of the present invention will be described. Here, description will be made mainly on a point in which the wireless communication system 1 of this embodiment is different from the first embodiment. Therefore, the configuration and operation of this embodiment are similar to those of the first embodiment unless otherwise especially referred to.

In this embodiment, the operation of the measurement result reducing section 9 performed when a measurement report is created is different from that of the first embodiment. Therefore, the operation of the measurement result reducing section 9 of the terminal apparatus 2 in the fifth embodiment will be described here with reference to drawings.

Figure 13:
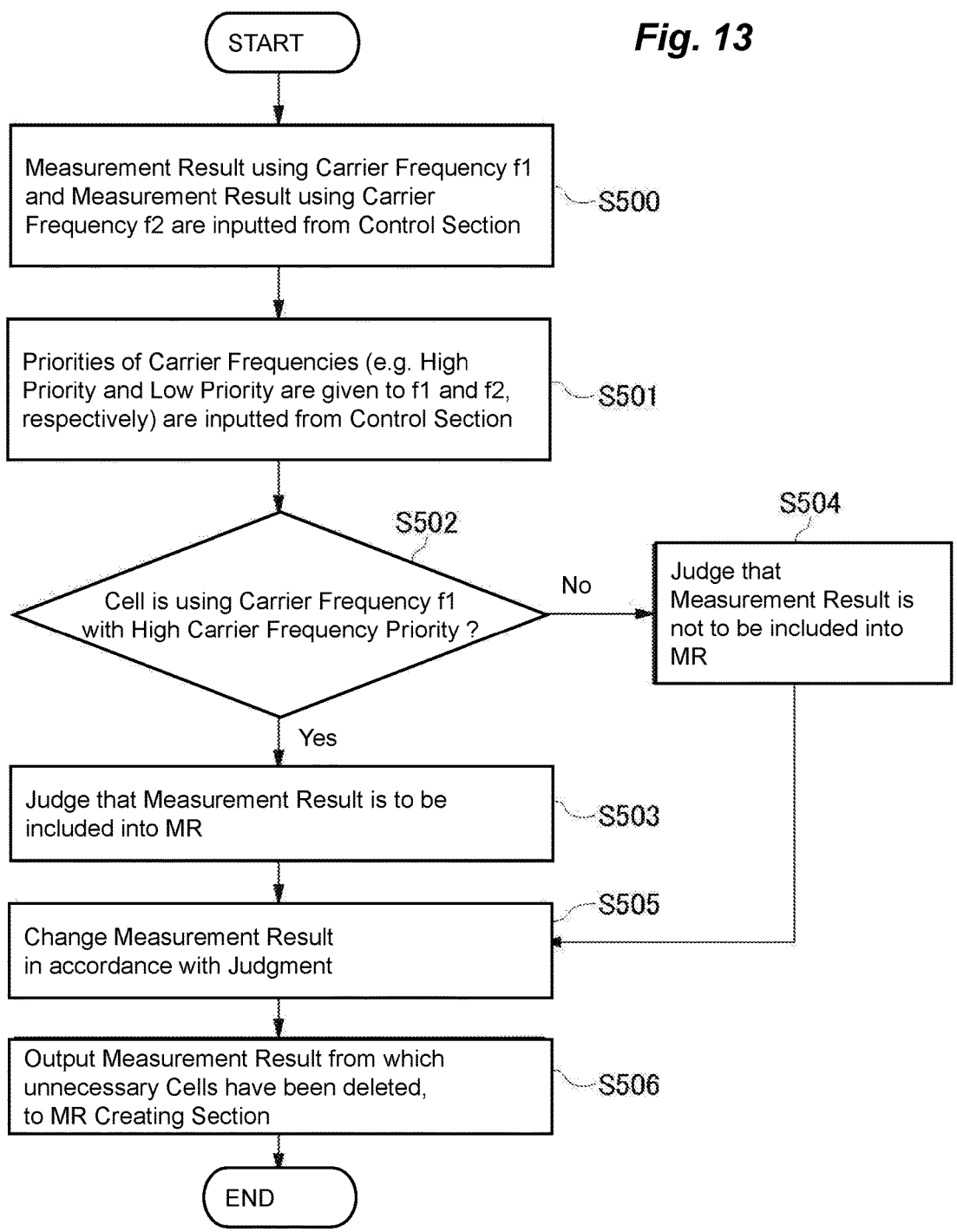
FIG. 13 is a flowchart showing the operation of a measurement result reducing section in a fifth embodiment.

FIG. 13 is a flowchart showing the operation of the measurement result reducing section 9 of the fifth embodiment. First, a measurement result constituted by cells using the carrier frequency of each component carrier is inputted to the measurement result reducing section 9 (S500), as shown in FIG. 13. Here, it is assumed that a measurement result measurement result constituted by cells using the carrier frequency f1 and a measurement result measurement result constituted by cells using the carrier frequency f2 are inputted. Next, priorities of the carrier frequencies (for example, f1 and f2 indicate a high priority and a low priority, respectively) are inputted to the measurement result reducing section 9 from the control section 6 (S501). Then, the measurement result reducing section 9 judges whether the measurement result is constituted by cells using the frequency f1 with a high carrier frequency priority (S502).

If it is judged that the measurement result is constituted by cells using the frequency f1 with a high carrier frequency priority, the measurement result reducing section 9 judges that the measurement result is to be included into a measurement report (S503). On the other hand, if it is judged that the measurement result is constituted by cells using the frequency f2 with a low carrier frequency priority, the measurement result reducing section 9 judges that the measurement result is not to be included into the measurement report (S504).

As described above, the measurement result is changed on the basis of a result of judging cells to be deleted from the measurement report and cells to be included into the measurement report (S505), and the measurement result from which unnecessary cells have been deleted, is outputted to the measurement report creating section 7 (S506).

Thus, by the measurement result reducing section 9 selecting cells to be included into a measurement report according to priorities of carrier frequencies, it is possible to create a measurement report which includes only such cells that are judged to have a high probability of being used for handover.

Operations and advantages similar to those of the first embodiment can be obtained by the wireless communication system 1 of the fifth embodiment.

In the wireless communication system 1 of this embodiment, priorities at the time of performing handover are set for multiple frequencies, respectively, in the terminal apparatus 2, and the measurement report creating section 7 is configured to select a measurement report of a frequency selected on the basis of the priorities, from among measurement reports of cells at multiple frequencies, as information indicating the radio conditions of cells at another frequency.

Due to this configuration, a measurement report of a frequency selected from among measurement reports of cells at multiple frequencies on the basis of the handover priorities set in the terminal apparatus 2 is selected as information indicating the radio conditions of cells at another frequency. That is, cells to be included into a measurement report are selected on the basis of priorities given to the terminal apparatus 2 from the base station 3. Therefore, in comparison with the case of including all the measurement reports of the multiple frequencies, the data size of the measurement report to be transmitted from the terminal apparatus 2 to the base station 3 can be reduced, and it becomes possible to reduce the amount of traffic. The priorities may be set in the terminal apparatus 2 in advance or may be received from the base station 3 and set in the terminal apparatus 2.

Sixth Embodiment

The wireless communication system of this embodiment is characterized in measurement configuration. According to the measurement configuration of this embodiment, it is possible to collect multiple frequency measurement results into one measurement report. Though there are some examples of such measurement configuration, three main examples will be described below. That is, the description below is on examples of the measurement configuration of the present invention, and it goes without saying that other measurement configurations may be used.

Figure 17:
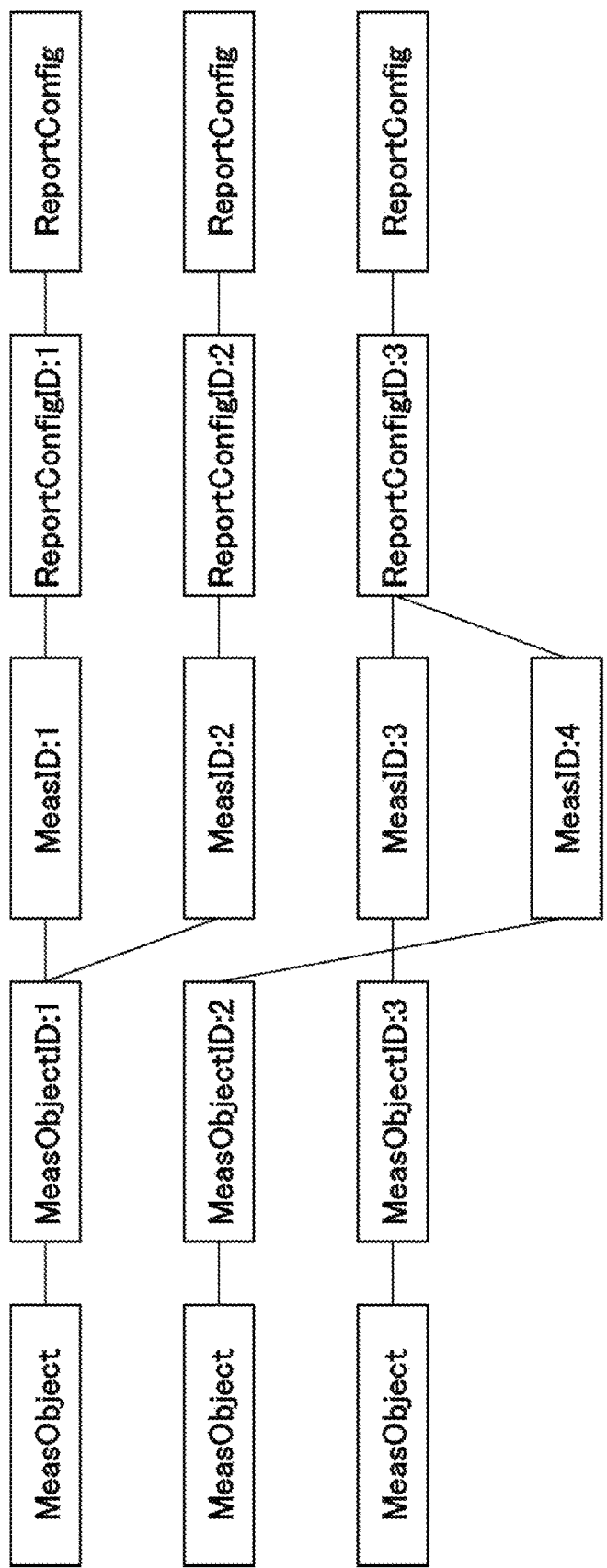
FIG. 17 is a diagram showing an example of measurement configuration.
Figure 18:
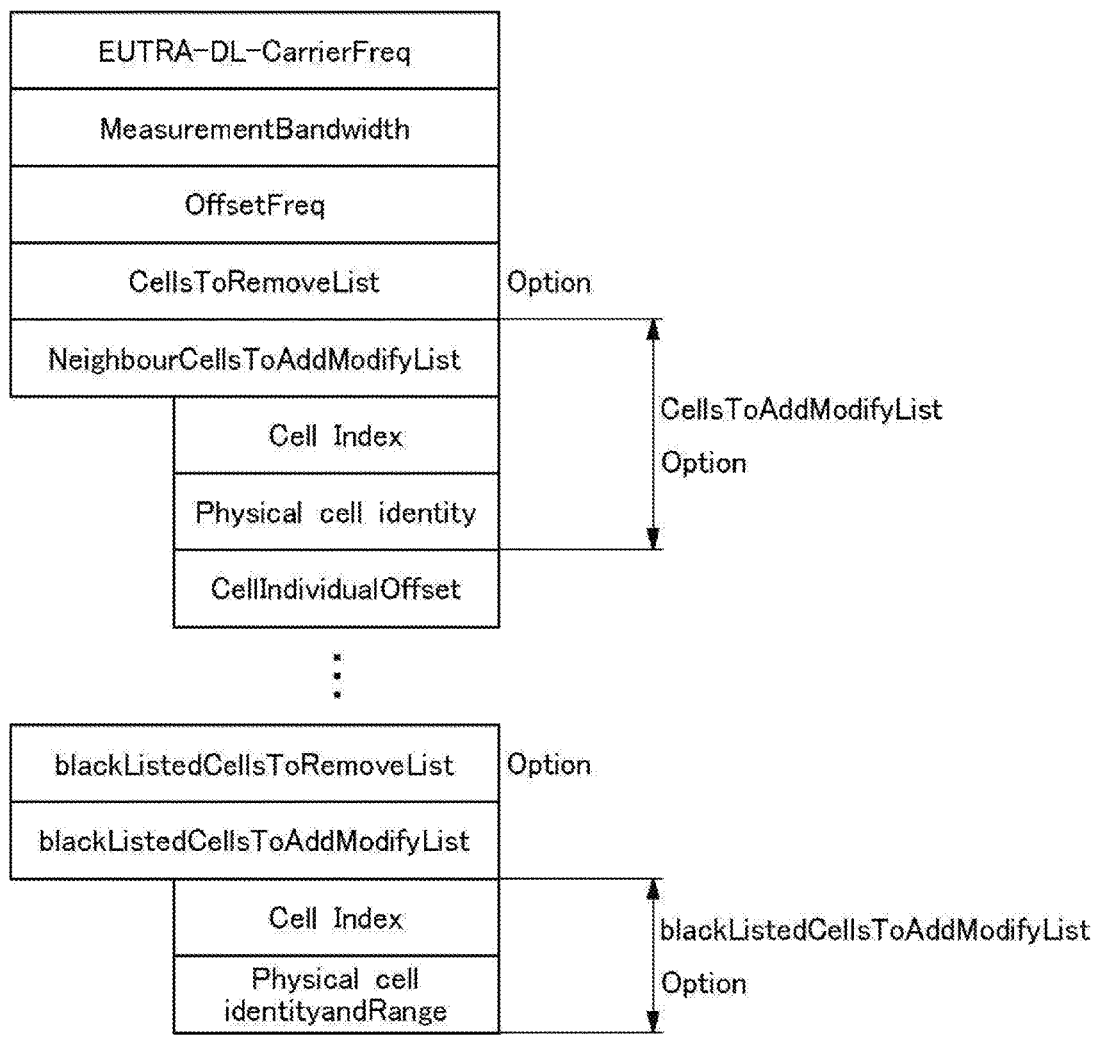
FIG. 18 is a diagram showing an example of MeasObject.
Figure 19:
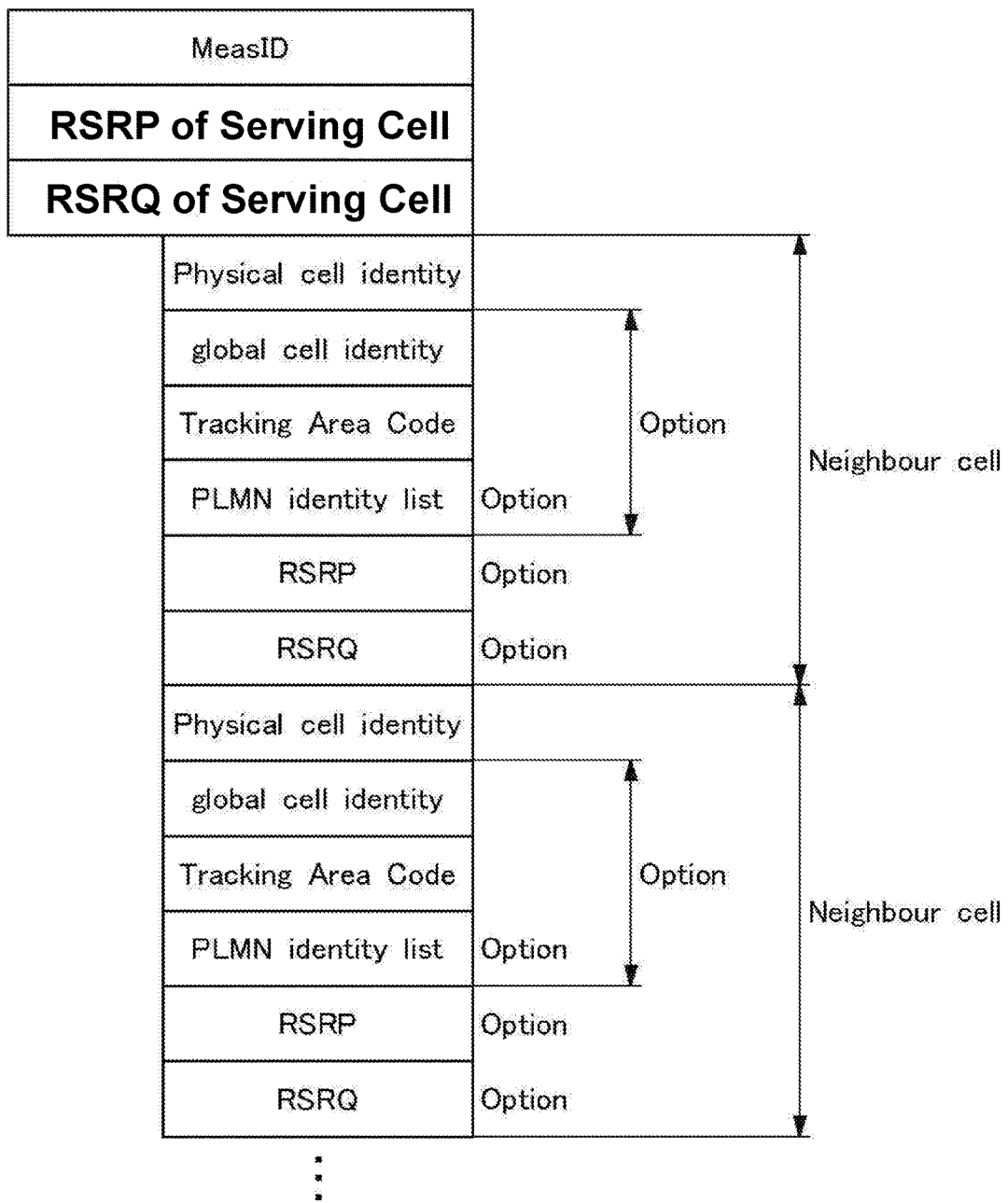
FIG. 19 is a diagram showing an example of a measurement report.

As shown in FIG. 17, a first example is configuration in which one measurement object identity (MeasObjectID) and one report configuration identity (ReportConfigID) are combined with one measurement identity (MeasID). In this case, it is necessary that a method for collecting measurement results obtained by performing measurement with different measurement identities (MeasIDs) into one measurement report is notified from the base station 3 to the terminal apparatus 2 or known by the terminal apparatus 2 in advance. As for the method for collecting the measurement results into one measurement report, there are some such methods.

A first method is as follows. Measurement results to be periodically sent and measurement results to be sent at the time of occurrence of an event are separated, and the measurement results to be periodically sent are collected into one measurement report, and the measurement results to be sent at the time of occurrence of an event are collected into one measurement report. Thereby, measurement reports with different purposes, that is, the measurement results to be periodically sent and the measurement results to be sent at the time of occurrence of an event can be separately sent, so that the base station 3 can easily perform control. The terminal apparatus 2 also can easily select cells to be included into a measurement report.

A second is a method of collecting measurement results into one measurement report for each event set in report configuration (ReportConfig). Thereby, it is possible to send a measurement report for each event, and therefore, it is possible to send measurement reports according to purposes in more detail. Thus, the base station 3 can know conditions of the terminal apparatus 2 resembling each other among frequencies and, therefore, can easily perform control. The terminal apparatus 2 also can easily select cells to be included into a measurement report.

A third is a method of collecting measurement results to be sent at the time of occurrence of an event into one measurement report without collecting measurement results to be periodically sent. Thereby, since it is possible to collectively send measurement reports to be sent at the time of occurrence of an event, the base station 3 can easily perform control. The terminal apparatus 2 also can easily select cells to be included into a measurement report.

A fourth is a method of collecting measurement results into one measurement report for each event set in report configuration (ReportConfig) without collecting measurement results to be periodically sent. Thereby, it is possible to collectively send measurement reports each of which is to be sent for each event. Thus, the base station 3 can know conditions of the terminal apparatus 2 resembling each other among frequencies and, therefore, can easily perform control. The terminal apparatus 2 also can easily select cells to be included into a measurement report. Thereby, existing configuration can be used. In methods other than this method, it is possible to collect measurement results into one measurement result by using the first example.

A method is also possible in which, by setting multiple frequencies for a measurement object (MeasObject), multiple frequency measurement results are collected into one measurement report. Thereby, it is possible to easily collect measurement results for each event.

Figure 21:
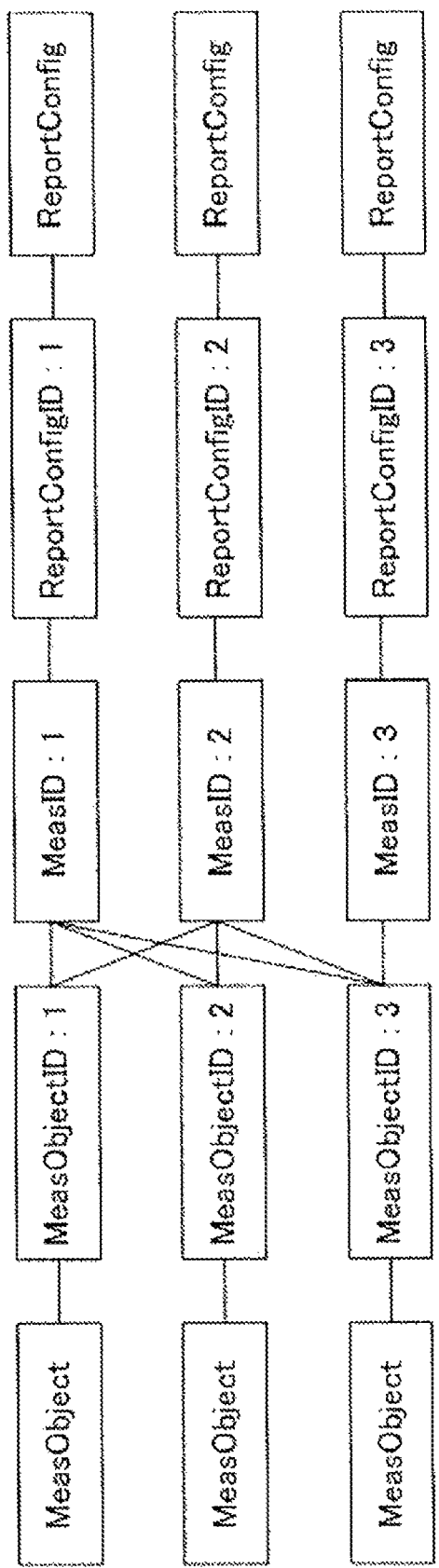
FIG. 21 is a diagram showing an example of measurement configuration in a sixth embodiment.
Figure 22:
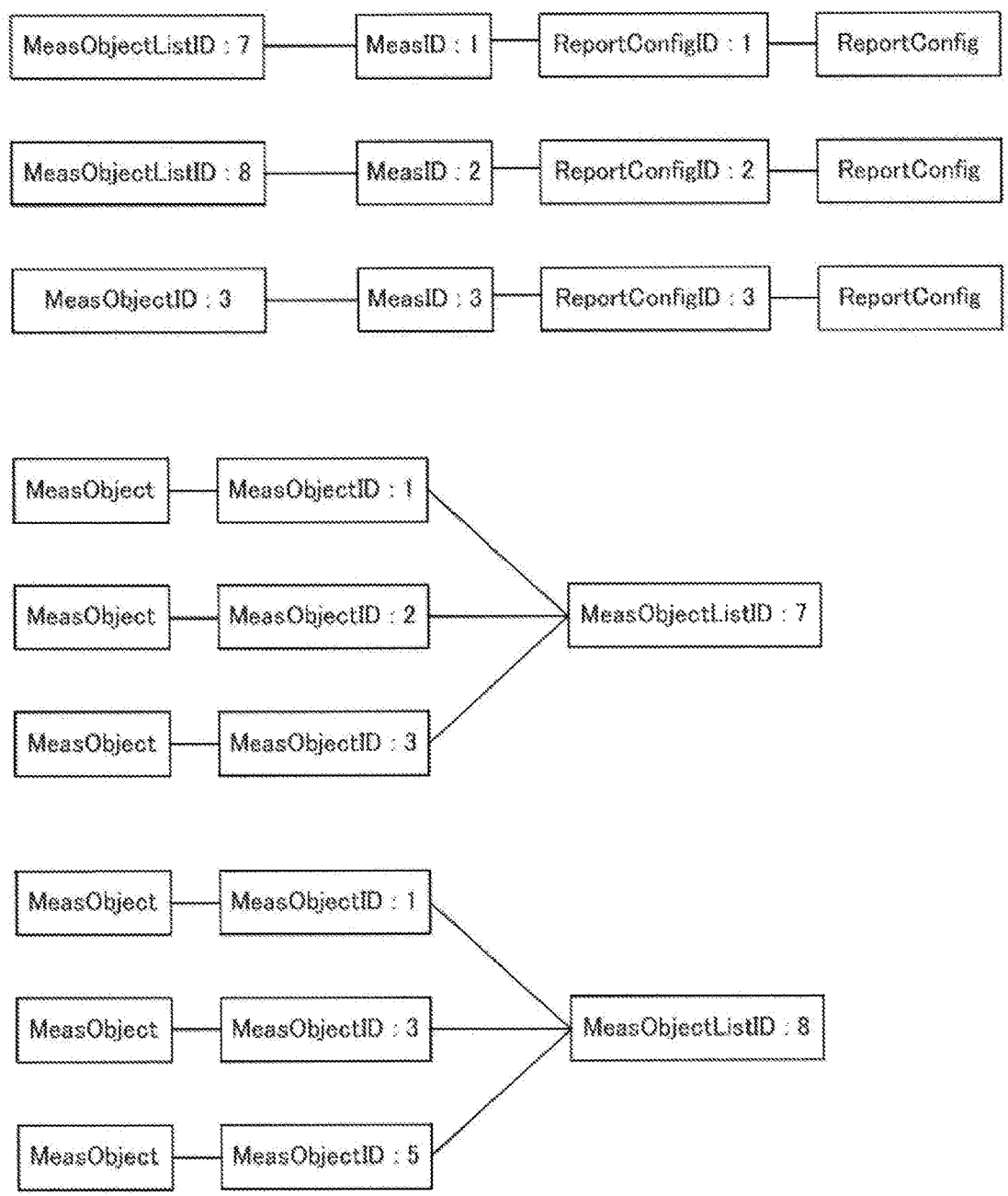
FIG. 22 is a diagram showing another example of measurement configuration.

As shown in FIG. 21, a second example is configuration in which multiple measurement object identities (MeasObjectIDs) and one report configuration identity (ReportConfigID) are combined with one measurement identity (MeasID). Thus, by collecting measurement object identities (MeasObjectIDs) corresponding to only one frequency and combining them with one measurement identity (MeasID), the base station 3 can notify measurement configuration for collecting multiple frequency measurement results into one measurement report, to the terminal apparatus 2. The base station 3 can set cells which the terminal apparatus 2 is to include into one measurement report, according to purposes. Since the terminal apparatus 2 only has to send one measurement report for each measurement configuration indicated by a measurement identity (MeasID), it is easy to select cells to be included into a measurement report. Since the terminal apparatus 2 only has to send one measurement report for each measurement configuration, it is one measurement identity that is to be included into a measurement report, and therefore, the measurement report format can be simplified.

A third example is configuration in which a measurement object list ID (MeasObjectListID) is newly provided, and one measurement object identity (MeasObjectID) and one report identity (ReportConfigID) are combined with one measurement identity (MeasID). The measurement object list ID (MeasObjectListID) is an identity for combining multiple measurement object identities (MeasObjectIDs) with one another. Thereby, advantages similar to those of the second example can be obtained. Furthermore, by introducing the measurement object list ID (MeasObjectListID), the measurement configuration format can be obtained only addition to an existing format, and therefore, backward compatibility is improved.

Seventh Embodiment

The wireless communication system of this embodiment is characterized in configuration of a serving cell. That is, the terminal apparatus 2 uses the received quality of a serving cell as a criterion for judging an event after starting measurement. Though there are some examples of this serving cell configuration, five main examples will be described below. That is, the description below is on examples of serving cell configuration of the present invention, and it goes without saying that a serving cell may be configured in other methods. This serving cell configuration is performed by the control section 6 of the terminal apparatus 2. Therefore, the control section 6 of the terminal apparatus 2 can be said to be serving cell configuration means.

A first example is a method of configuring one cell as a serving cell. There are some methods for selecting a serving cell. A first is a method in which a cell to be used as a serving cell is notified to the terminal apparatus 2 from the base station 3. A second is a method in which a cell which is for the terminal apparatus 2 maintaining connection with the base station 3 (for example, performing security management) and which is called a special cell or an anchor carrier, is configured as a serving cell. A third is a method in which a cell (or component carrier) with the best received quality is configured as a serving cell from among cells (or component carriers) which can be used as a serving cell. Thereby, if the radio condition of at least one of component carriers used by the terminal apparatus 2 is good, an event does not easily occur and a measurement report is not easily sent. Therefore, it is possible to reduce useless measurement reports. A fourth is a method in which a cell (or component carrier) with the worst received quality is configured as a serving cell from among cells (or component carriers) which can be used as a serving cell. Thereby, if the radio condition of at least one of component carriers used by the terminal apparatus 2 is good, an event easily occurs and a measurement report is easily sent. Therefore, it is possible to perform mobility control earlier.

A second example is a method of configuring one for each measurement object (MeasObject). This is a method in which, if the frequency handed over to a measurement object is used by the terminal apparatus 2, the cell (or component carrier) is used as a serving cell. Thereby, event judgment in consideration of characteristics for each frequency is performed, and therefore, a more suitable measurement report can be sent. Therefore, mobility control can be appropriately performed. As for frequencies which are not used by the terminal apparatus 2, there are some methods. A first is a method in which a cell (or component carrier) to be used as a serving cell is notified from the base station 3 to the terminal apparatus 2. A second is a method in which a special cell is used as a serving cell. A third is a method in which a cell (or component carrier) with the best received quality, among cells (or component carriers) being used, is used as a serving cell. A fourth is a method in which a cell (or component carrier) with the worst received quality, among cells (or component carriers) being used, is used as a serving cell. A fifth is a method in which the closest cell (or component carrier), among cells (or component carriers) being used, is used as a serving cell. A sixth is a method in which the closest cell (or component carrier), among cells (or component carriers) belonging to the same frequency band and being used, is configured as a serving cell. A method may be used in which the above methods are switched for each event. Thereby, it is possible to cause an event to easily occur or not to easily occur in accordance with the characteristics of events.

A third example is a method in which a serving cell is configured for each component carrier to which a physical downlink control channel (hereinafter referred to simply as a "PDCCH") is sent. As for a cell (or component carrier) to which the PDCCH has not been sent, among frequencies being used, a cell (or a component carrier) which sends a PDCCH indicating a physical downlink shared channel (hereinafter referred to simply as a "PDSCH") of the cell (or component carrier) is used as a serving cell. Thereby, event judgment in consideration of characteristics for each frequency is performed while the number of serving cells is limited, and therefore, a suitable measurement report can be sent. Therefore, mobility control can be appropriately performed. As for frequencies which are not used, the same as the above second example is applied.

A fourth example is a method in which a serving cell is configured by notifying the serving cell from the base station 3 to the terminal apparatus 2. For example, a 800-MHz band and a 2-GHz band are used at the same time, one serving cell is configured for each of the 800-MHz band and the 2-GHz band. Thereby, event judgment in consideration of characteristics for each frequency is performed while the number of serving cells is suppressed more, and therefore, a suitable measurement report can be sent. Therefore, mobility control can be appropriately performed.

A fifth example is a method in which a serving cell is notified for each report configuration (ReportConfig) and configured. For example, 1 bit is used to notify that one cell is used as a serving cell or that multiple cells are used as serving cells. Thereby, it is possible to use both of the case of using one cell as a serving cell and the case of using multiple cells as serving cells. The one cell may be configured by the method of the above first example. The multiple cells may be configured by the methods of the above second and third examples.

A sixth example is a method in which a serving cell is notified for each measurement identity (MeasID) and configured. For example, 1 bit is used to notify that one cell is used as a serving cell or that multiple cells are used as serving cells. Thereby, it is possible to use both of the case of using one cell as a serving cell and the case of using multiple cells as serving cells. Furthermore, thereby, the amount of information for configuration can be reduced. The one cell may be configured by the method of the above first example. The multiple cells may be configured by the methods of the above second and third examples.

When the terminal switches the component carrier to be used for carrier aggregation (at the time of handover and at the time of re-establishment, or at the time of notification of switching from the base station), it is possible to switch measurement configuration, following switching of the component carrier to be used, without a notification of change in the measurement configuration. For example, this is a method of, when a method of switching a measurement object identity (MeasObjectID) associated with a measurement identity (MeasID) is executed, switching a serving cell also.

Description will be made below on the case where a serving cell is associated with each measurement identity (MeasID) as an example. Description will be made also on the case where, when performing carrier aggregation using the component carriers of f1 and f2, the terminal switches the carrier aggregation to carrier aggregation using the component carriers of f2 and f3 as an example.

At this time, the terminal does not change the measurement configuration of the component carrier of f2 because it continues using the component carrier of f2. When a measurement identity (measID: 1) and serving cells (multiple serving cells are used as serving cells (f1)) are associated with a measurement object identity of f1 (MeasObjectID: 1), and a measurement identity (measID: 3) and a serving cell (one cell is used as a serving cell (f2)) are associated with a measurement object identity of f3 (MeasObjectID: 3), then the association of the measurement identity (measID: 1) is switched to association with a measurement object identity (MeasObjectID: 3) and serving cells (multiple serving cells are used as serving cells (f3)), and the association of the measurement identity (measID: 3) is switched to association with the measurement object identity (MeasObjectID: 1) and the serving cell (one cell is used as a serving cell (f2)).

Thereby, it is possible to continue using measurement configuration associated with a measurement identity (MeasID) to perform measurement within the same frequency and measurement configuration associated with a measurement identity (MeasID) to perform measurement between different frequencies while maintaining the purposes. The serving cells is changed according to the carrier frequency of an associated measurement object identity (MeasObjectID), though whether one cell is used as a serving cell or multiple cells are used as serving cells is kept being associated with a measurement identity (MeasID).

Even in the case where there are multiple candidates for switching, the present invention can be applied by judging whether the purpose is measurement within a frequency or measurement among frequencies, because the present invention is characterized in maintaining a purpose.

For example, if multiple measurement object identities (MeasObjectIDs) can be associated with a measurement identity, and the terminal switches carrier aggregation with two component carriers to carrier aggregation with three component carriers, association with a measurement object identity (MeasObjectID) and serving cells corresponding to a purpose is performed. If multiple measurement identities cannot be associated with a measurement identity, it is possible to switch the association for a measurement object identity for which a measurement identity corresponding to a purpose exists, and release association for a measurement object identity for which a measurement identity corresponding to a purpose does not exist.

If multiple measurement identities cannot be associated with a measurement identity, it is possible to associate measurement object identities with the measurement identity by giving priorities, and release the existing association for such a measurement object identity that cannot be associated with a measurement identity corresponding to a purpose. Priorities are given so that those which have been used are preferentially maintained. A measurement identity of a carrier frequency belonging to the same band as the carrier frequency of a measurement object identity associated with a measurement identity may be prioritized.

Thereby, parameters for measurement configuration associated with a measurement identity easily become more appropriate. In addition, a higher priority may be given to an anchor carrier, a carrier with a good received quality, a carrier through which the terminal receives a PDCCH, or the like. If a measurement identity corresponding to a purpose does not exist, the measurement configuration therefor may be deleted.

Eighth Embodiment

The wireless communication system of this embodiment is characterized in configuration of a serving cell to be a criterion at the time of performing Inter-RAT. In measurement configuration for a different radio access technique (Inter-RAT: Inter Radio Access Technology), there is an event called an event B2 (a serving cell is below a threshold 1, and an Inter-RAT cell is above a threshold 2). At this time, the thresholds 1 and 2 are included in the measurement configuration. Though there are some configurations of a serving cell to be a criterion, six main examples will be described below. That is, the description below is on examples of serving cell configuration of the present invention, and it goes without saying that other methods may be used. This serving cell configuration is performed by the control section 6 of the terminal apparatus 2. Therefore, the control section 6 of the terminal apparatus 2 can be said to be serving cell configuration means.

A first example is a method in which, when the reception qualities of all serving cells set as serving cells are below the threshold 1, it is judged that a part of the event B2 (a serving cell is below a threshold 1) is satisfied. Thereby, the terminal apparatus 2 can preferentially use E-UTRA when E-UTRA can be used.

A second example is a method in which, when the reception qualities of all cells (or component carriers) being used, among serving cells set as serving cells, are below the threshold 1, it is judged that a part of the event B2 (a serving cell is below a threshold 1) is satisfied. Thereby, the terminal apparatus 2 can preferentially use E-UTRA when it is possible to continue using E-UTRA being used.

A third example is a method in which, when the received quality of one serving cell, among serving cells set as serving cells, is below the threshold 1, it is judged that a part of the event B2 (a serving cell is below a threshold 1) is satisfied. Thereby, the terminal apparatus 2 can quickly look for an appropriate RAT checking the conditions of other RATs if at least a part of the condition of E-UTRA gets worse.

A fourth example is a method in which, when the received quality of one serving cell, among cells (or component carriers) being used among serving cells set as serving cells, is below the threshold 1, it is judged that a part of the event B2 (a serving cell is below a threshold 1) is satisfied. Thereby, the terminal apparatus 2 can quickly look for an appropriate RAT checking the conditions of other RATs if at least a part of the condition of E-UTRA being used gets worse.

A fifth example is a method in which, when the average of the reception qualities of all serving cells set as serving cells are below the threshold 1, it is judged that a part of the event B2 (a serving cell is below a threshold 1) is satisfied. Thereby, it is possible to impartially handle E-UTRA and RAT.

A sixth example is a method in which, when the average of the reception qualities of all cells (or component carriers) being used, among serving cells set as serving cells, are below the threshold 1, it is judged that a part of the event B2 (a serving cell is below a threshold 1) is satisfied. Thereby, it is possible to impartially handle E-UTRA and RAT being used by the terminal apparatus 2.

Ninth Embodiment

The wireless communication system of this embodiment is characterized in a method for selecting a serving cell to be included into a measurement report. Here, a method for selecting a serving cell to be included into a measurement report at the time of performing Inter-RAT. Though there are some methods for selecting a serving cell to be included into an Inter-RAT measurement report, four main examples will be described below. That is, the description below is on examples of a serving cell selection method of the present invention, and it goes without saying that other methods may be used. Selection of a serving cell to be included into a measurement report is performed by the control section 6 of the terminal apparatus 2. Therefore, the control section 6 of the terminal apparatus 2 can be said to be serving cell selection means.

A first example is a method of including all of measurement results of cells (or component carriers) set as serving cells. Thereby, the base station 3 can know the conditions of all the cells (or component carriers) set as serving cells and, therefore, can know the conditions of all the cells which it wants to know, and appropriately select a component carrier to be used by the terminal apparatus 2.

A second example is a method of including all of measurement results of cells (or component carriers) being used by the terminal apparatus 2, among cells (or component carriers) set as serving cells. Thereby, the base station 3 can grasp the condition of the use by the terminal apparatus 2 and, therefore, can appropriately select a cell (or component carrier) to be used by the terminal apparatus 2.

A third example is a method of including a measurement result of a cell (or component carrier) with the worst received quality among cells set as serving cells. Thereby, the base station 3 can judge whether it is necessary to switch the component carrier used by the terminal apparatus 2.

A fourth example is a method of including a measurement result of a cell (or component carrier) with the best received quality among cells set as serving cells. Thereby, the base station 3 can judge whether the terminal apparatus 2 can keep connection.

Next, a method for selecting a serving cell to be included into a measurement report in the case measurement configuration for measurement within E-UTRAN is set. When the measurement configuration for measurement within E-UTRAN is set, there are some examples of a serving cell selection method at the time of an event A1 (a serving cell is above a threshold), an event A2 (a serving cell is below a threshold), an event A3 (a neighbor cell is better than a serving cell), and an event 4 (a neighbor cell is better than a threshold), and an event A5 (a serving cell is worse than a threshold 1 and a neighbor cell is better than a threshold 2). Though five main examples will be described below, they are examples of the serving cell selection method of the present invention, and it goes without saying that other methods may be used, similarly as described above.

A first example is a method of including all of cells (or component carriers) set as serving cells. Thereby, the base station 3 can know the conditions of all the cells (or component carriers) set as serving cells and, therefore, can know the conditions of all the cells which it wants to know, and appropriately select a component carrier to be used by the terminal apparatus 2.

A second example is a method of including all of cells (or component carriers) being used, among cells (or component carriers) set as serving cells. Thereby, the base station 3 can grasp the condition of the use by the terminal apparatus 2 and, therefore, can appropriately select a cell (or component carrier) to be used by the terminal apparatus 2.

A third example is a method of including only a serving cell among cells (or component carriers) where an event has occurred, among cells (or component carriers) set as serving cells. Thereby, if there is a cell (or component carrier) to be compared, the base station 3 can know a measurement result of the serving cell.

A fourth example is a method of including a measurement result of a serving cell with a frequency at which there is a cell (or component carrier) other than a serving cell to be included into a measurement report, among cells set as serving cells. Thereby, if there is a cell (or component carrier) to be compared, the base station 3 can know a measurement result of the serving cell.

A fifth example is a method of including a measurement result of a serving cell with a frequency at which there is a measurement object (MeasObject) corresponding to a measurement identity (MeasID) of measurement for which a measurement report is to be sent, among cells set as serving cells. Thereby, it is possible to prevent a useless serving cell measurement result from being sent.

If the same serving cell is used among multiple frequencies, a measurement result of the serving cell may not be included for each frequency. Thereby, it is possible to prevent a useless serving cell measurement result from being included.

As described above, if all of cells (or component carriers) set as serving cells are included into a measurement report, all of set frequencies can be considered to perform handover. Therefore, if there is a better cell (or component carrier), the cell (or component carrier) can be used. If a part of the cells (or component carriers) set as serving cells are included, it is possible to consider only a frequency satisfying conditions. Therefore, it is possible to compare cells (or component carriers) with a frequency used by the terminal apparatus 2 and select a better one while suppressing resources.

Tenth Embodiment

The wireless communication system of this embodiment is characterized in setting of a threshold for each frequency at the time of the event A1 (a serving cell is above a threshold), the event A2 (a serving cell is below a threshold), the event 4 (a neighbor cell is better than a threshold), and the event A5 (a serving cell is worse than a threshold 1 and a neighbor cell is better than a threshold 2).

If there is one measurement configuration identity (ReportConfigID) to be combined with a measurement identity (MeasID), the threshold used for event judgment at the events A1, A2, A4 and A5 is equal among frequencies. Even if the threshold is equal among frequencies, it is possible to add an offset to the threshold for each frequency without adding an offset to report configuration (ReportConfig) by utilizing an offset included in a measurement object (MeasObject). Therefore, it is possible to perform event judgment in consideration of frequency characteristics without adding overhead to the report configuration (ReportConfig).

Eleventh Embodiment

The wireless communication system of this embodiment is characterized in a method for selecting a cell to be included into a measurement report at the time of handing over cell pair information. This cell selection is performed by the control section 6 of the terminal apparatus 2. Therefore, the control section 6 of the terminal apparatus 2 can be said to be cell selection means.

Figure 23:
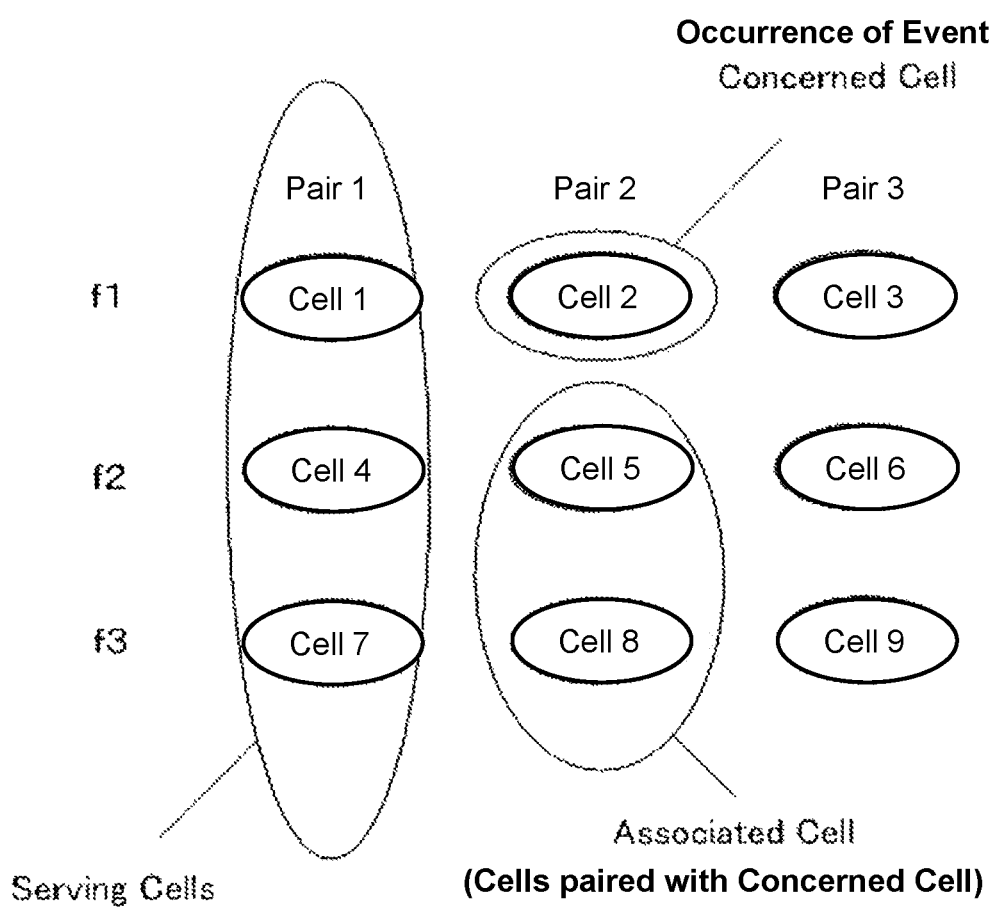
FIG. 23 is an illustrative diagram of a cell selection method in an eleventh embodiment.

The cell selection method of this embodiment will be described with the use of an example in FIG. 23. As shown in FIG. 23, three pairs are formed in this example. A first pair (pair A) is constituted by cells 1, 4 and 7; a second pair (pair B) is constituted by cells 2, 5 and 8; and a third pair (pair C) is constituted by cells 3, 6 and 9. The cells 1, 2 and 3 are cells with the frequency f1; the cells 4, 5 and 6 are cells with the frequency f2; and the cells 7, 8 and 9 are cells with the frequency 3.

Such sell pair information is set by the base station 3. The cell pair information may be communicated to the terminal apparatus 2 by a definite control signal. Alternatively, a method is also possible in which the cell pair information is communicated to the terminal apparatus 2 only with the same information as before, for example, on the assumption that cells having the same cell ID (PCI) are paired.

The terminal apparatus 2 uses the cells belonging to the pair A as serving cells. If an event occurs in the cell 2, the cells 1, 4 and 7 are included into a measurement report as serving cells, and the cell 2 where the event occurred is included into the measurement report as a concerned cell. Furthermore, the cells 5 and 8 belonging to the same pair B as the cell 2 are included into the measurement report as associated cells. Thereby, carrier aggregation can be switched to a more appropriate pair.

Here, the case of including measurement results of the concerned cell (cell 2) and the associated cells (cells 5 and 8) in addition to measurement results of the multiple serving cells (cells 1, 4 and 7) has been described as an example. However, the scope of the present invention is not limited thereto. For example, the measurement result of the associated cell is not necessarily to be included, and, as for the measurement results of the serving cells, the measurement result only one serving cell may be included.

Twelfth Embodiment

The wireless communication system of this embodiment is characterized in the format of a measurement report. Here, there is shown, first, an example of a measurement report in the case of including measurement results of multiple measurement identities (MeasIDs) into one measurement report as shown in the first example in the sixth embodiment (measurement configuration). Two main examples will be described below. However, it goes without saying that the present invention is not limited thereto.

A first example is an example of the case where a measurement report format is newly generated without adding a measurement report format to an existing format. FIG. 24 is a diagram showing an example of adding a new measurement report format into MeasurementReport. In the example in FIG. 24, measurementReport-r10 is added into MeasurementReport so that measurementReport-r10 can be selected to use the new format and measurementReport-r8 can be selected to use the old existing format. The new format is constituted by measResults-r10 and nonCriticalExtension.

FIG. 25 shows a part of the configuration of MeasResults-r10, which is the contents of measResults-r10. Omitted components are similar to those of Non Patent Literature 1. FIG. 25 is a diagram showing the component MeasResults-r10 which is added as a component of the new format of MeasurementReport in FIG. 24. MeasResults-r10 is constituted by measResultsSet-r10. MeasResultsSet-r10, which is the contents of measResultsSet-r10, is constituted by the number of MeasResults used in the old existing format equal to or less than number. Thereby, the existing components can be used and, therefore, it is possible to collect measurement results corresponding to multiple measurement identities into one measurement report while decreasing the number of components to be newly provided.

In this case, as for the measurement results to be included into the one measurement report, only those judged to be collected into one measurement report can be included. The method assumes that serving cell measurement results are included for each of measurement identities (MeasIDs) to be included into a measurement report. However, by causing serving cell measurement results to be optionally selected, it is possible to flexibly select serving cell measurement results to be included, for example, select including only one serving cell measurement result or select including only a measurement result of a criterion serving cell.

A second example is an example of the case where a measurement report format is added to an existing format, and the example is shown in FIG. 26. In FIG. 26, measResults-v10x0 is added to MeasResults, and measResults-v10x0 is constituted by MeasResultsSet-r10. MeasResultsSet-r10 is constituted by MeasResults-r10. The configuration of MeasResults-r10 is almost the same as that of MeasResults. However, measResultServCell is OPTIONAL. Thereby, at the time of including measurement results corresponding to multiple measurement identities (MeasIDs) into one measurement report, only one serving cell measurement result can be included. Thereby, at the time of including measurement results corresponding to multiple measurement identities (MeasIDs) into one measurement report, only measurement results of a criterion serving cell can be included as serving cell measurement results to be included.

In the case of including a serving cell measurement result for each measurement identity (MeasID), positions to be changed can be reduced because MeasResults-r10 can be set to be the same as MeasResults. In the case of including only one serving cell measurement result into a measurement report, measResultServCell may be erased from MeasResults-r10. Thereby, bits (information) for OPTIONAL can be decreased. Omitted components are similar to those of Non Patent Literature 1.

Next, there will be shown an example of a measurement report in the case of including a measurement result based on measurement configuration for one measurement identity (MeasID) into one measurement report as shown in the second or third example in the sixth embodiment (measurement configuration). Two main examples will be described below. However, it goes without saying that the present invention is not limited thereto.

A first example is an example of the case where a measurement report format is newly generated without adding a measurement report format to an existing format. The example of adding a new measurement report format into MeasurementReport is the same as FIG. 24. FIG. 27 shows a part of the configuration of MeasResults-r10, which is the contents of measResults-r10. MeasResults-r10 is constituted by measId and measResultsSet-r10. MeasResultsSet-r10 is constituted by the number of MeasResultsBody-r10's equal to or less than number. MeasResultsBody-r10 is the old existing format MeasResults in which measID is changed to measObjectID. Thereby, it is possible to include information about which frequency is corresponded. By setting a serving cell measurement result to be included into a measurement report as OPTIONAL, it is possible to select a serving cell measurement result to be included into a measurement report.

Because measObjectID is for indicating frequency information, it can be replaced with such that indicates frequency information. If it is known that only one serving cell measurement result is to be included, measResultsServCell may be included into MeasResults-r10 and deleted from MeasResultsBody-r10. Thereby, bits (information) for OPTIONAL can be decreased. Omitted components are similar to those of Non Patent Literature 1.

A second example is an example of the case where a measurement report format is added to an existing format, and the example is shown in FIG. 28. FIG. 28 is almost the same as FIG. 26. The figures are different only in that measID in MeasResults-r10 in FIG. 26 is replaced with measObjectID in MeasResults-r10 in FIG. 28. Thereby, it is possible to judge which frequency an added part belongs to. At this time, by setting information to be included into the existing format part as anchor carrier or special cell information, it is possible to separate information to be included into the existing format part and information to be included into a new format part.

In addition to the above information, the information to be included into the existing format part may be determined in other methods such as determining information having the smallest MeasObjectID to be the information to be included. It is also possible to use such that indicates frequency information instead of MeasObjectID. In the case of including only one serving cell measurement result, it is possible to use the format in FIG. 6.

In the case where multiple measurement objects (MeasObjects) are combined with a measurement identity (MeasID), that is, in the case of the second or third example in the sixth embodiment (measurement configuration), RSRQ may be included in addition to RSRP. Thereby, it is possible to select an appropriate cell in consideration of interference also. In the case of including a serving cell with a frequency for which a measurement object (MeasObject) is not set, it is made possible by providing a line for inputting a set of serving cells.

Thirteenth Embodiment

The wireless communication system of this embodiment is characterized in selection of a cell to be included into a measurement report at the time of performing periodical reporting. If sending a report periodically (periodic reporting) is set, the terminal apparatus 2 sends a serving cell and a strongest cell by including them into a measurement report. The strongest cell refers to a cell with a high received power (may refer to multiple cells with a high received power), and it does not necessarily refer to only one cell with the highest received power. In this case, the number of the strongest cells to be included is restricted to some extent, and there are some methods for selecting the strongest cells. Three main examples of cell selection will be described below. However, it goes without saying that other methods may be used. Selection of the strongest cells is performed by the control section 6 of the terminal apparatus 2. Therefore, the control section 6 of the terminal apparatus 2 can be said to be strongest cell selection means.

A first example is a method of sequentially including cells into a measurement report in descending order with a cell with the highest received power at the top, irrespective of frequency. A second example is a method in which one cell with a high received power is included for each frequency, and, if there is left space for including strongest cells, cells are sequentially included into a measurement report in descending order with a cell with the highest received power at the top, irrespective of frequency. Thereby, the base station 3 can know each of information about frequencies at which a periodic report is to be sent, without causing lack of balance among frequencies. A third example is a method of sequentially including cells into a measurement report in descending order with a cell with the highest received power at the top for each frequency so that the number of cells is almost the same among frequencies. In this case, if the same number of cells are not included for all the frequencies, there are two kinds of frequency selections for increasing the number of cells. A first is a method in which a lot of cells with a lower received power, among strongest cells, are preferentially included. A second is a method in which a lot of cells with a high received power, among strongest cells, are preferentially included. These methods can be applied to the case of periodically sending a report after occurrence of an event.

The embodiments of the present invention have been described above with the use of examples. However, the scope of the present invention is not limited thereto, and modifications/variations can be made according to purposes within the scope described in the claims.

For example, though the first to thirteenth embodiments have been separately described in the above description, the scope of the present invention is not limited thereto. These embodiments can be used in combination with one another.

Furthermore, in the above description, a method has been described as an example in which the measurement result reducing section 9 selects a cell to be included into a measurement report from a carrier frequency measurement result of a components carrier which is already used by the terminal apparatus 2. However, even in the case where a cell using the carrier frequency of a component carrier which is not used by the terminal apparatus 2 is included in a measurement result, the above embodiments can be used.

Furthermore, in the above description, an example has been given in which, when the terminal apparatus 2 is performing band aggregation, the cell quality is described with RSRP if a measurement report is created on the basis of only a measurement result based on the carrier frequency of one component carrier, and the cell quality is described with RSRQ if the measurement report is created by including a measurement result based on the carrier frequency of the other component carrier also. However, it is also possible to include a flag indicating whether to create a measurement report on the basis of only a measurement result based on the carrier frequency of one component carrier or to set the measurement report which includes a measurement result based on the carrier frequency of the other component carrier also, into the measurement report for distinction.

Figure 14:
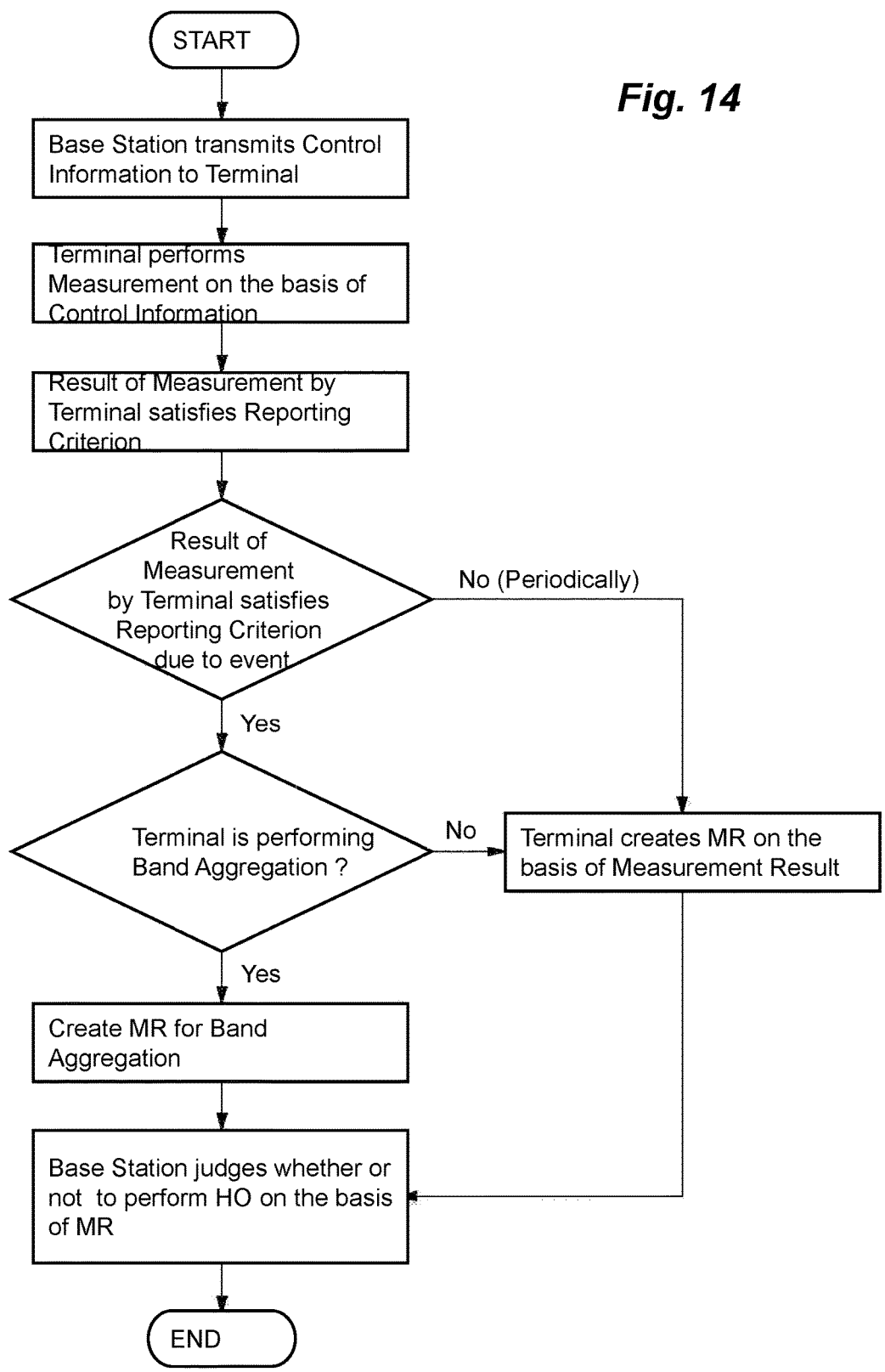
FIG. 14 is a flowchart showing the flow of transmission of a measurement report in another embodiment.
Figure 15:
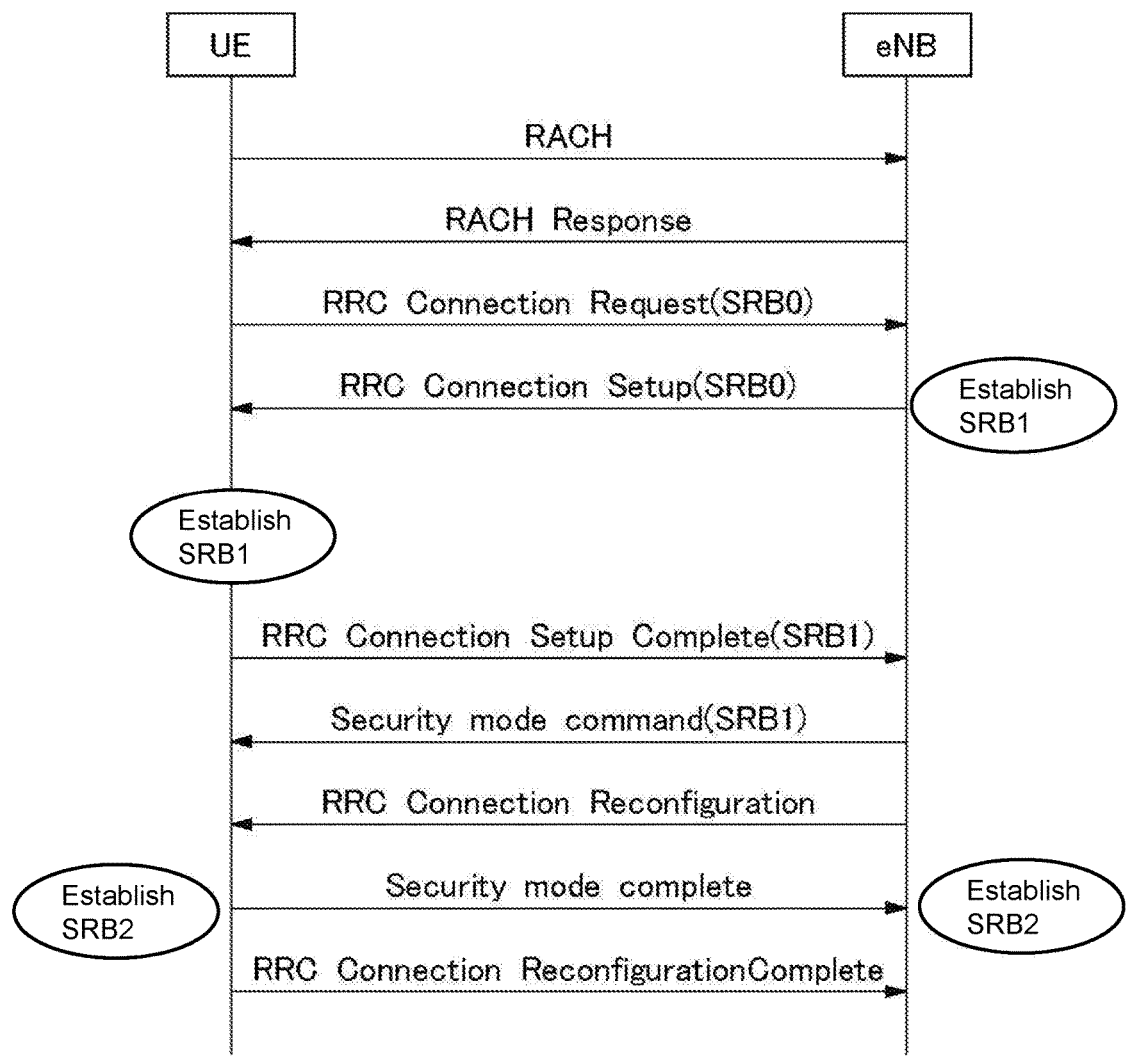
FIG. 15 is a sequence diagram for illustrating transition from an idle state of a terminal to a connected state.
Figure 16:
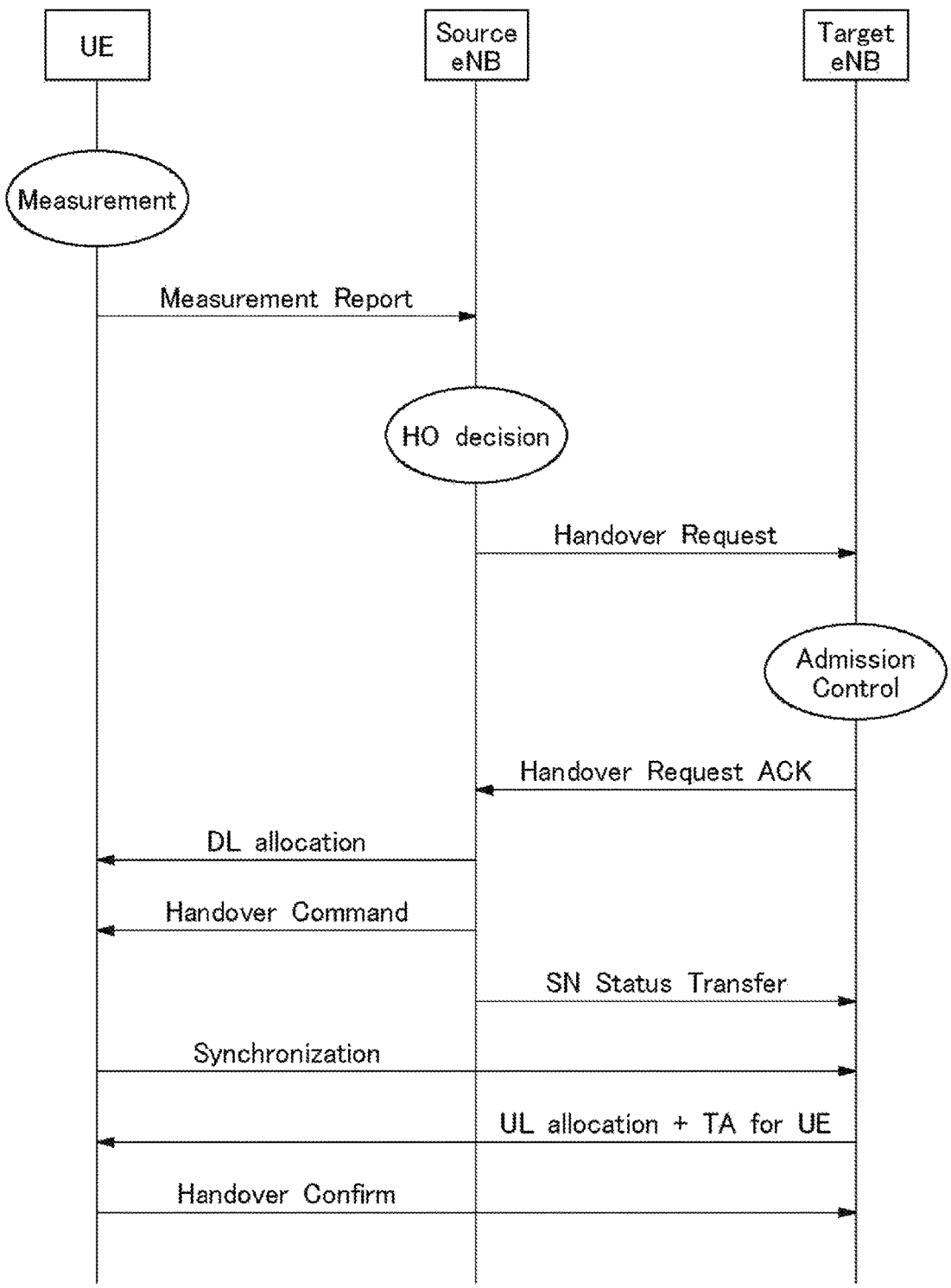
FIG. 16 is a sequence diagram showing an example of handover.

Furthermore, in the above description, when the measurement result reporting criterion is satisfied at the carrier frequency of one component carrier when the terminal apparatus 2 is performing band aggregation, it is judged whether all of measurement results based on the carrier frequency of the other component carrier are to be included into a measurement report. However, as shown in FIG. 14, the judgment may be performed only when an event causing transmission of a measurement report occurs, and judgment about whether or not to include a measurement result based on the carrier frequency of the other component carrier into a measurement report may not be performed in the case of periodically reporting a measurement result after occurrence of an event and the case of periodically reporting a measurement result. Furthermore, it may be judged that a measurement result based on the carrier frequency of the other component carrier is to be included only in the case where an event causing transmission of a measurement report occurs and in the case of periodically reporting a measurement result after occurrence of an event, and it may not be judged that a measurement result based on the carrier frequency of the other component carrier is to be included, in the case of periodically reporting a measurement result.

Furthermore, it is possible to apply the present invention only in the case where band aggregation is performed with the use of different frequency bands (for example, a 800-MHz band and a 2-GHz band) and not to apply the present invention in the case where band aggregation is performed with the use of the same frequency band. Thereby, it is possible to send information required for decision of handover to the base station 3 while suppressing processing required for the terminal apparatus 2 to set a measurement report. Even in the case of performing band aggregation using the same frequency band, it is possible to determine whether or not to apply the present invention according to the degree of difference between frequencies and the radio condition.

Preferable embodiments of the present invention conceivable at present have been described. It is intended that it is understood that various variations of the embodiments are possible, and that all such variations within the true spirit and scope of the present invention are included in the accompanying claims.

INDUSTRIAL APPLICABILITY

As described above, the wireless communication system according to the present invention is a wireless communication system in which a base station and a terminal apparatus are communicable with each other using multiple frequencies, and the wireless communication system has an advantage of being capable of shortening time required for handover and is useful as a wireless communication system using LTE or SAE, and the like.

REFERENCE SIGNS LIST

1 Wireless Communication System
2 Terminal Apparatus
3 Base Station
4 Reception Section
5 Measurement Information Managing Section
6 Control Section
7 Measurement Report (MR) Creating Section
8 Transmission Section
9 Measurement Result Reducing Section
10 Reception Section
11 Measurement Information Managing Section
12 Handover (HO) Judgment Processing Section
13 Control Section
14 Transmission Section
15 Judgment Processing Section for Band-Aggregation
16 Normal Judgment Processing Section

The invention claimed is:

1. A terminal apparatus comprising:
a transceiver, which, in operation, communicates with a base station apparatus; and
control circuitry coupled to the transceiver, wherein the control circuitry, in operation,
  detects occurrences of an event in a cell among multiple cells including both serving cells, which are aggregately used by the transceiver to communicate with the base station apparatus on serving frequencies, and non-serving cells, which are not presently used by the transceiver to communicate with the base station apparatus;
  measures radio conditions of the serving cells and the non-serving cells; and
  in response to detection of an occurrence of the event, creates a measurement report indicating radio conditions of the best non-serving cell selected from the non-serving cells based on reference signal received power (RSRP) on one of the serving frequencies, the measurement report excluding radio conditions of non-selected non-serving cell(s) for which the radio conditions are measured.

2. The terminal apparatus according to the claim 1, wherein the measurement report includes a list of the best non-serving cells in order of decreasing RSRP.

3. The terminal apparatus according to claim 1, wherein a policy for deciding the multiple cells, for which radio conditions are measured, is set in the terminal apparatus.

4. The terminal apparatus according to claim 1, wherein the best non-serving cell is a cell judged to have a higher RSRP in comparison with a reference RSRP.

5. The terminal apparatus according to claim 1, wherein the measurement report additionally indicates radio conditions of the serving cells on the serving frequencies.

6. The terminal apparatus according to claim 5, wherein the radio conditions of the serving cells and of the best non-serving cell are combined in one measurement report.

7. The terminal apparatus according to claim 1, wherein the serving frequencies include a primary frequency and a secondary frequency, wherein the control circuitry, in operation, determines whether to create the measurement report additionally indicating radio conditions of a cell on the primary frequency, or to create the measurement report additionally indicating radio conditions of the cell on the primary frequency and of a cell on the secondary frequency.

8. A wireless communication method comprising:
a terminal apparatus communicating with a base station apparatus;
the terminal apparatus detecting occurrences of an event in a cell among multiple cells including both serving cells, which are aggregately used by the transceiver to communicate with the base station apparatus on serving frequencies, and non-serving cells, which are not presently used by the transceiver to communicate with the base station apparatus;

the terminal apparatus measuring radio conditions of the serving cells and the non-serving cells; and the terminal apparatus, in response to detection of an occurrence of the event, creating a measurement report indicating radio conditions of the best non-serving cell selected from the non-serving cells based on reference signal received power (RSRP) on one of the serving frequencies, the measurement report excluding radio conditions of non-selected non-serving cell(s) for which the radio conditions are measured.

9. The method according to the claim 8, wherein the measurement report includes a list of the best non-serving cells in order of decreasing RSRP.

10. The method according to claim 8, wherein a policy for deciding the multiple cells, for which radio conditions are measured, is set in the terminal apparatus.

11. The method according to claim 8, wherein the best non-serving cell is a cell judged to have a higher RSRP in comparison with a reference RSRP.

12. The method according to claim 8, wherein the measurement report additionally indicates radio conditions of the serving cells on the serving frequencies.

13. The method according to claim 12, wherein the radio conditions of the serving cells and of the best non-serving cell are combined in one measurement report.

14. The method according to claim 8, wherein the serving frequencies include a primary frequency and a secondary frequency, wherein the method further comprises the terminal apparatus determining whether to create the measurement report additionally indicating radio conditions of a cell on the primary frequency, or to create the measurement report additionally indicating radio conditions of the cell on the primary frequency and of a cell on the secondary frequency.

* * * * *